(12) United States Patent
Hiramoto

(10) Patent No.: US 6,301,388 B1
(45) Date of Patent: Oct. 9, 2001

(54) IMAGE MATCHING APPARATUS

(75) Inventor: Masao Hiramoto, Katano (JP)

(73) Assignee: Matsushita Information Systems Co., Ltd., Osaka (JP)

(*) Notice: Subject to any disclaimer, the term of this patent is extended or adjusted under 35 U.S.C. 154(b) by 0 days.

(21) Appl. No.: 09/290,614

(22) Filed: Apr. 13, 1999

(30) Foreign Application Priority Data

Apr. 14, 1998 (JP) .................................................. 10-102948
Mar. 16, 1999 (JP) .................................................. 11-071022

(51) Int. Cl.[7] .................................................. G06K 9/68
(52) U.S. Cl. .......................... 382/218; 382/209; 382/278
(58) Field of Search .................................... 382/209–219, 382/278, 283, 286, 294–298; 340/937; 348/135, 149

(56) References Cited

U.S. PATENT DOCUMENTS

| | | | |
|---|---|---|---|
| 5,065,440 | * 11/1991 | Yoshida et al. | 382/219 |
| 5,554,983 | * 9/1996 | Kitamura et al. | 340/937 |
| 5,872,871 | * 2/1999 | Yokoyama et al. | 382/292 |
| 5,969,753 | * 10/1999 | Robinson | 348/130 |
| 6,011,866 | * 1/2000 | Donelly, et al. | 382/216 |
| 6,023,530 | * 2/2000 | Wilson | 382/219 |
| 6,088,483 | * 7/2000 | Nakano et al. | 382/209 |
| 6,111,984 | * 8/2000 | Fukasawa | 382/209 |
| 6,115,505 | * 9/2000 | Hashima et al. | 382/236 |
| 6,122,401 | * 9/2000 | Nagao | 382/216 |

FOREIGN PATENT DOCUMENTS 6-231254   8/1994   (JP) .

OTHER PUBLICATIONS

Handbook of Image Analysis with partial English translation, M. Takagi & A. Shimoda eds., University of Tokyo Press, Jan. 17, 1991.

* cited by examiner

Primary Examiner—Matthew C. Bella
Assistant Examiner—Gregory Desire
(74) Attorney, Agent, or Firm—Wenderoth, Lind & Ponack, L.L.P.

(57) ABSTRACT

To provide an image matching apparatus that realizes a new method for comparing two images which differ in sizes and orientations. In an image recognition system, for each of two plane images on which two-dimensional orthogonal wavelet decomposition has been performed, a two-dimensional feature information generating unit detects large spatial gradients in the horizontal and vertical directions of the plane image and expresses the spatial gradients as two-dimensional vectors that are present in spatial positions of the plane image. Next, a three-dimensional vector generating unit uses one of the spatial positions and a direction of a two-dimensional vector present in the spatial position respectively as a reference point and a reference direction, to express the other two-dimensional vectors using three-dimensional vectors which are each made up of a magnitude component and two angle components. Lastly, a judging unit compares a group of three-dimensional vectors generated for one plane image with a group of three-dimensional vectors generated for the other plane image, to judge whether the two plane images match.

20 Claims, 14 Drawing Sheets

FIG. 4
$\phi(t)$ : SCALING FUNCTION
$$\phi(t) = \begin{cases} 1, & 0 \leq t < 1 \\ 0, & \text{OTHERWISE} \end{cases}$$
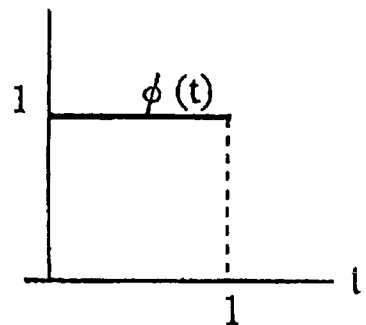
$\psi(t)$ : MOTHER WAVELET FUNCTION
$$\psi(t) = \begin{cases} 1, & 0 \leq t < 1/2 \\ -1, & 1/2 \leq t < 1 \\ 0, & \text{OTHERWISE} \end{cases}$$
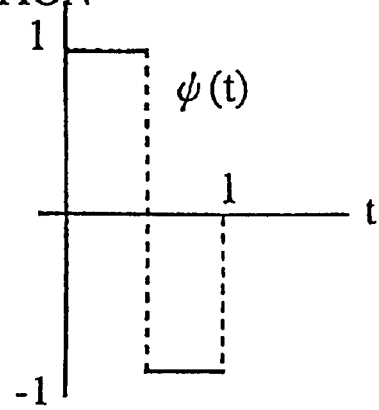

FIG. 5

| $A_{1,1}$ | $A_{1,2}$ | $A_{1,3}$ | $A_{1,4}$ | . | . | . | $A_{1,2N}$ |
|---|---|---|---|---|---|---|---|
| $A_{2,1}$ | $A_{2,2}$ | $A_{2,3}$ | $A_{2,4}$ | . | . | . | $A_{2,2N}$ |
| . | . | . | . | . | . | . | . |
| $A_{2N,1}$ | $A_{2N,2}$ | $A_{2N,3}$ | $A_{2N,4}$ | . | . | . | $A_{2N,2N}$ |

FIG. 6

| MRA COMPONENT | | | HORIZONTAL MRR COMPONENT | | |
|---|---|---|---|---|---|
| $A_{1,1}+A_{1,2}$ $+A_{2,1}+A_{2,2}$ | $A_{1,3}+A_{1,4}$ $+A_{2,3}+A_{2,4}$ | ... ... | $A_{1,1}-A_{1,2}$ $+A_{2,1}-A_{2,2}$ | $A_{1,3}-A_{1,4}$ $+A_{2,3}-A_{2,4}$ | ... ... |
| : | | | | | |
| $A_{1,1}+A_{1,2}$ $-A_{2,1}-A_{2,2}$ | $A_{1,3}+A_{1,4}$ $-A_{2,3}-A_{2,4}$ | ... ... | $A_{1,1}-A_{1,2}$ $-A_{2,1}+A_{2,2}$ | $A_{1,3}-A_{1,4}$ $-A_{2,3}+A_{2,4}$ | ... ... |
| : | | | | | |
| VERTICAL MRR COMPONENT | | | DIAGONAL MRR COMPONENT | | |

IMAGE MATCHING APPARATUS

This application is based on applications Nos. 10-102948 and 11-71022 filed in Japan, the contents of which are hereby incorporated by reference.

BACKGROUND OF THE INVENTION

1. Field of the Invention

The present invention relates to an image recognition technique, and in particular relates to an image matching technique for judging whether two plane images match.

2. Description of the Related Art

With rapid developments in hardware and software technologies in recent years, high-volume image data has become widely used in information processing.

For instance, an image database made up of considerable amounts of image data and managed under a database management system is used in various fields, such as medical care, office works, and scientific researches.

For instance, an image database made up of considerable amounts of image data and managed under a database management system is used in various fields, such as medical care, office work, and scientific research.

The last mentioned comparison method can also be applied to recognition of a captured image, by using the captured image as the retrieval key and searching the image database for an image that matches the captured image.

The following is an explanation of a conventional image matching technique used for the above comparison method.

FIGS. 1A and 1B are a conceptual diagram showing image matching in the conventional technique.

Images 901, 902, and 903 are each made up of 32×32 sets of pixel data, while a part of pixel data which compose image 901 is enlarged in image 910. Here, the sets of pixel data that make up each of the images have an 8-step monochrome graduation and therefore the actual images should be delivered in shades of gray, though the gray levels of the images are omitted in FIG. 1. A value assigned to each set of pixel data represents an intensity level of the pixel.

When images 902 and 903 are stored in an image database and image 901 is used as a retrieval key, image matching is performed as follows.

To compare image 901 with image 902 using the conventional image matching technique, the following calculation is performed for sets of pixel data $C_1, C_2, C_3, \ldots, C_{1024}$ which make up image 901 and sets of pixel data $D_1, D_2, D_3, \ldots, D_{1024}$ which make up image 902.

$$\eta = (\Sigma C_j \cdot D_j)/(\sqrt{\Sigma C_j^2} \cdot \sqrt{\Sigma D_j^2}) \quad [j=1\sim1024]$$

When $\eta$ approximates to 1, it is judged that images 901 and 902 match.

The same calculation is performed to compare image 901 with image 903.

However, when an image has been captured using scaling and rotation, such a image is not congruent with but is merely similar to the other image with which the image is to be compared.

FIG. 2 shows two images 911 and 902 that differ in sizes and orientations.

To compare image 911 with image 902 using the conventional image matching technique, scaling and rotation have to be repeatedly performed on image 911 to judge whether image 911 matches image 902, that is, whether the object in image 911 is identical to the object in image 902.

SUMMARY OF THE INVENTION

The present invention aims to provide an image matching apparatus for comparing two images using a new image matching method, in view of diversifying needs for image matching with increasing uses of image data.

The above object can be fulfilled by an image matching apparatus for judging whether a first two-dimensional image and a second two-dimensional image match, the first two-dimensional image and the second two-dimensional image each being made up of a plurality of sets of pixel data in a two-dimensional xy coordinate plane, the image matching apparatus including: a first two-dimensional vector group storing unit for storing a plurality of two-dimensional vectors which are generated using a plurality of sets of pixel data of the first two-dimensional image and which respectively correspond to a plurality of positions in the first two-dimensional image, each of the plurality of two-dimensional vectors including a component relating to an x direction and a component relating to a y direction to show a feature, among a plurality of features of the first two-dimensional image, that is present in a corresponding position; a second two-dimensional vector group storing unit for storing a plurality of two-dimensional vectors which are generated using a plurality of sets of pixel data of the second two-dimensional image and which respectively correspond to a plurality of positions in the second two-dimensional image, each of the plurality of two-dimensional vectors including a component relating to the x direction and a component relating to the y direction to show a feature, among a plurality of features of the second two-dimensional image, that is present in a corresponding position; and a matching unit for judging that the first two-dimensional image and the second two-dimensional image match, when a distribution of the plurality of two-dimensional vectors stored in the first two-dimensional vector storing unit in the two-dimensional xy coordinate plane and a distribution of the plurality of two-dimensional vectors stored in the second two-dimensional vector storing unit in the two-dimensional xy coordinate plane satisfy predetermined matching conditions.

With this construction, a two-dimensional image can be expressed as image feature information about each of a plurality of positions in a two-dimensional xy coordinate plane, wherein the image feature information represents the change of values of a plurality of pixels around the position in the two-dimensional image. The image feature information shows, for example, spatial gradients of pixel data in each of the plurality of positions in the horizontal and vertical directions, where such spatial gradients are obtained by performing two-dimensional orthogonal wavelet decomposition on the two-dimensional image. The image feature information can be expressed as a two-dimensional vector composed of an x component and a y component.

By comparing image feature information of one two-dimensional image with image feature information of the other two-dimensional image, the image matching apparatus can perform image matching more efficiency than conventional techniques.

Also, when one of the plurality of positions is set as a reference position, a direction of a two-dimensional vector in the reference position is set as a reference direction. As a result, it is possible to describe each of the plurality of positions aside from the reference position by: a distance r from the reference position to the position; an angle α which a two-dimensional vector from the reference position to the position forms with respect to the reference direction; and an angle β which a two-dimensional vector (image feature information composed of an x component and a y component) in the position forms with respect to the reference position. As a result, the two-dimensional image can be expressed using a group of vectors which are each made up of components derived from a distance r, an angle α, and an angle β, without depending on whether the image has been rotated or not.

When two two-dimensional images that differ in orientations are each expressed as a vector group, the two images are judged as matching when angle components α and β in a distribution of vectors of one vector group match angle components α and β in a distribution of vectors of the other vector group to some extent. Likewise, when two two-dimensional images that differ in sizes and orientations are each expressed as a vector group, the two images are judged as matching when, in addition to a match of angle components α and β, distance components r in a distribution of vectors of one vector group are proportional to components r in a distribution of vectors of the other vector group to some extent.

Thus, two two-dimensional images that differ in sizes and orientations can be compared with each other efficiently.

Here, a distribution of vectors denotes either a distribution of vectors, each composed of a distance r, an angle α and an angle β, in a three-dimensional coordinate space, or a distribution of vectors, each composed of a distance r and an angle (α–β), in a two-dimensional coordinate space.

Accordingly, two two-dimensional images that differ in sizes and orientations can be compared with each other, without rotation and scaling being repeatedly performed on one of the images as the conventional techniques. Also, the number of computations necessary for image matching can be stabilized to a certain degree in this image matching method.

Here, the plurality of two-dimensional vectors in the first two-dimensional vector group storing unit may be a plurality of two-dimensional vectors Va that are each composed of an x component and a y component corresponding to one of the plurality of positions in the first two-dimensional image, the x component and the y component respectively being a spatial gradient of a value of a set of pixel data in the x direction and a spatial gradient of the value of the set of pixel data in the y direction, wherein the plurality of two-dimensional vectors in the second two-dimensional vector group storing unit are a plurality of two-dimensional vectors Vb that are each composed of an x component and a y component corresponding to one of the plurality of positions in the second two-dimensional image, the x component and the y component respectively being a spatial gradient of a value of a set of pixel data in the x direction and a spatial gradient of the value of the set of pixel data in the y direction, and wherein the matching unit includes: a first reference specifying unit for specifying one of the plurality of positions in the first two-dimensional image as a first position; a second reference specifying unit for specifying one of the plurality of positions in the second two-dimensional image as a second position; a first three-dimensional vector group generating unit for generating, for each of the plurality of positions in the first two-dimensional image aside from the first position, a three-dimensional vector Ra composed of a component r, a component α, and a component β, the component r being a magnitude of a two-dimensional vector Roa which directs from the first position to the position, the component α being an angle which the two-dimensional vector Roa forms with a two-dimensional vector Va present in the first position, and the component β being an angle which a two-dimensional vector Va present in the position forms with the two-dimensional vector Va present in the first position; a second three-dimensional vector group generating unit for generating, for each of the plurality of positions in the second two-dimensional image aside from the second position, a three-dimensional vector Rb composed of a component r, a component α, and a component β, the component r being a magnitude of a two-dimensional vector Rob which directs from the second position to the position, the component α being an angle which the two-dimensional vector Rob forms with a two-dimensional vector vb present in the second position, and the component β being an angle which a two-dimensional vector Vb present in the position forms with the two-dimensional vector Vb present in the second position; and a first judging unit for judging that the predetermined matching conditions are satisfied and accordingly the first two-dimensional image and the second two-dimensional image match, when in a distribution of a plurality of three-dimensional vectors Ra generated by the first three-dimensional vector group generating unit and in a distribution of a plurality of three-dimensional vectors Rb generated by the second three-dimensional vector group generating unit, components α and components β of the plurality of three-dimensional vectors Ra match components α and components β of the plurality of three-dimensional vectors Rb to a first predetermined degree, and components r of the plurality of three-dimensional vectors Ra are proportional to components r of the plurality of three-dimensional vectors Rb to a second predetermined degree.

With this construction, a reference position is set for each of two two-dimensional images and a group of three-dimensional vectors is generated for each of the two images based on the reference position. If a comparison between two groups of three-dimensional vectors results in a mismatch, a reference position of one of the two images is changed and a group of three-dimensional vectors is newly generated to be compared with the other group of three-dimensional vectors. By doing so, two two-dimensional images that differ in sizes and orientations can be compared with each other.

Here, the first judging unit may judge that the predetermined matching conditions are satisfied and accordingly the first two-dimensional image and the second two-dimensional image match, when a number of combinations of three-dimensional vectors Ra and three-dimensional vectors Rb, obtained by detecting each three-dimensional vector Ra, among the plurality of three-dimensional vectors Ra, whose component α and component β match a component α and a component β of any of the plurality of three-dimensional vectors Rb to a third predetermined degree, is no less than a predetermined value, and a ratio between a component r of a three-dimensional vector Ra and a component r of a three-dimensional vector Rb in each of the combinations is constant to a fourth predetermined degree for all of the combinations.

With this construction, by checking proportionality of magnitude components r of each two three-dimensional vectors that have matching angle components α and β, judgement on whether components r of one group of three-dimensional vectors are proportional to components r of the other group of three-dimensional vectors can be made easily.

Here, spatial gradients in the x direction and spatial gradients in the y direction of the plurality of two-dimensional vectors in the first two-dimensional vector group storing unit may be obtained by performing two-dimensional orthogonal wavelet decomposition on the first two-dimensional image a first number of times using a Haar basis, wherein spatial gradients in the x direction and spatial gradients in the y direction of the plurality of two-dimensional vectors in the second two-dimensional vector group storing unit are obtained by performing two-dimensional orthogonal wavelet decomposition on the second two-dimensional image a second number of times using the Haar basis.

With this construction, various effects can be obtained depending on how many times two-dimensional orthogonal wavelet decomposition is performed on a two-dimensional image. If two-dimensional orthogonal wavelet decomposition is performed a small number of times, image matching can be conducted according to local features of the image. If two-dimensional orthogonal wavelet decomposition is performed a large number of times, in contrast, image matching can be conducted according to general features of the image with fewer computations.

Here, each of the plurality of positions in the first two-dimensional image that respectively correspond to the plurality of two-dimensional vectors stored in the first two-dimensional vector group storing unit may be determined so that any of a spatial gradient in the x direction and a spatial gradient in the y direction of a two-dimensional vector present in the position exceeds a first predetermined value, wherein each of the plurality of positions in the second two-dimensional image that respectively correspond to the plurality of two-dimensional vectors stored in the second two-dimensional vector group storing unit is determined so that any of a spatial gradient in the x direction and a spatial gradient in the y direction of a two-dimensional vector present in the position exceeds a second predetermined value.

With this construction, a two-dimensional image can be expressed by a limited amount of information about distinctive features of the image. Accordingly, the number of elements used for image comparison is reduced, with it being possible to lessen the number of computations necessary for image matching.

Here, the matching unit may further include: a third three-dimensional vector group generating unit for replacing a component $\alpha$ and a component $\beta$ of each of the plurality of three-dimensional vectors Ra respectively with $(\pi+\alpha-\beta)$ and $(-\beta)$ where $\alpha$ and $\beta$ are the component $\alpha$ and the component $\beta$ of the three-dimensional vector Ra, as a new component $\alpha$ and a new component $\beta$, when in the distribution of the plurality of three-dimensional vectors Ra and in the distribution of the plurality of three-dimensional vectors Rb, the components $\alpha$ and the components $\beta$ of the plurality of three-dimensional vectors Ra do not match the components $\alpha$ and the components $\beta$ of the plurality of three-dimensional vectors Rb to the first predetermined degree or when the components r of the plurality of three-dimensional vectors Ra are not proportional to the components r of the plurality of three-dimensional vectors Rb to the second predetermined degree, setting one of the plurality of positions in the first two-dimensional image aside from the first position as a new first position, the new first position corresponding to a three-dimensional vector Ra, among the plurality of three-dimensional vectors Ra with new components $\alpha$ and new components $\beta$, whose new component $\alpha$ and new component $\beta$ match a component $\alpha$ and a components $\beta$ of any of the plurality of three-dimensional vectors Rb to the third predetermined degree, and generating, for each of the plurality of positions in the first two-dimensional image aside from the new first position, a three-dimensional vector Rc composed of a component r, a component $\alpha$, and a component $\beta$, the component r being a magnitude of a two-dimensional vector Roa which directs from the new first position to the position, the component $\alpha$ being an angle which the two-dimensional vector Roa forms with a two-dimensional vector Va present in the new first position, and the component $\beta$ being an angle which a two-dimensional vector Va present in the position forms with the two-dimensional vector Va present in the new first position; and a second judging unit for judging that the predetermined matching conditions are satisfied and accordingly the first two-dimensional image and the second two-dimensional image match, when in a distribution of a plurality of three-dimensional vectors Rc generated by the third three-dimensional vector group generating unit and in the distribution of the plurality of three-dimensional vectors Rb generated by the second three-dimensional vector group generating unit, components $\alpha$ and components $\beta$ of the plurality of three-dimensional vectors Rc match the components $\alpha$ and the components $\beta$ of the plurality of three-dimensional vectors Rb to the first predetermined degree, and components r of the plurality of three-dimensional vectors Rc are proportional to the components r of the plurality of three-dimensional vectors Rb to the second predetermined degree.

With this construction, selection of one of a plurality of possible reference positions does not have to be repeated many times until a reference position of one two-dimensional image that corresponds to the same part of an object as a reference position of the other two-dimensional image is detected.

Here, when among a group of the plurality of three-dimensional vectors Ra generated by the first three-dimensional vector group generating unit and a group of the plurality of three-dimensional vectors Rb generated by the second three-dimensional vector group generating unit, a group with no more three-dimensional vectors than another group is set as a three-dimensional vector group R1, the first judging unit may use a value that has a predetermined ratio to a number of three-dimensional vectors included in the three-dimensional vector group R1, as the predetermined value.

With this construction, when the number of three-dimensional vectors generated for one two-dimensional image is smaller than the number of three-dimensional vectors generated for the other two-dimensional image, comparison of angles is performed with respect to the smaller number, so that the number of computations necessary for image matching can be reduced.

Here, a number of the plurality of positions in the first two-dimensional image which respectively correspond to the plurality of two-dimensional vectors stored in the first two-dimensional vector group storing unit may be limited within a first predetermined number, wherein a number of the plurality of positions in the second two-dimensional image which respectively correspond to the plurality of two-dimensional vectors stored in the second two-dimensional vector group storing unit is limited within a second predetermined number.

With this construction, a two-dimensional image can be expressed by a limited amount of information. As a result, the number of elements used for image comparison is reduced, with it being possible to lessen the number of computations necessary for image matching.

Here, the plurality of two-dimensional vectors in the first two-dimensional vector group storing unit may be a plurality of two-dimensional vectors Va that are each composed of an x component and a y component corresponding to one of the plurality of positions in the first two-dimensional image, the x component and the y component respectively being a spatial gradient of a value of a set of pixel data in the x direction and a spatial gradient of the value of the set of pixel data in the y direction, wherein the plurality of two-dimensional vectors in the second two-dimensional vector group storing unit are a plurality of two-dimensional vectors Vb that are each composed of an x component and a y component corresponding to one of the plurality of positions in the second two-dimensional image, the x component and the y component respectively being a spatial gradient of a value of a set of pixel data in the x direction and a spatial gradient of the value of the set of pixel data in the y direction, and wherein the matching unit includes: a first reference specifying unit for specifying one of the plurality of positions in the first two-dimensional image as a first position; a second reference specifying unit for specifying one of the plurality of positions in the second two-dimensional image as a second position; a third reference specifying unit for specifying one of the plurality of positions in the first two-dimensional image aside from the first position as a third position; a fourth reference specifying unit for specifying one of the plurality of positions in the second two-dimensional image aside from the second position as a fourth position; a first comparative two-dimensional vector group generating unit for generating, for each of the plurality of positions in the first two-dimensional image aside from the first position, a comparative two-dimensional vector Rap composed of a component r and a component ($\alpha-\beta$), the component r being a magnitude of a two-dimensional vector Roap which directs from the first position to the position, $\alpha$ being an angle which the two-dimensional vector Roap forms with a two-dimensional vector Va in the first position, and $\beta$ being an angle which a two-dimensional vector Va in the position forms with the two-dimensional vector Va in the first position; a second comparative two-dimensional vector group generating unit for generating, for each of the plurality of positions in the second two-dimensional image aside from the second position, a comparative two-dimensional vector Rbp composed of a component r and a component ($\alpha-\beta$), the component r being a magnitude of a two-dimensional vector Robp which directs from the second position to the position, $\alpha$ being an angle which the two-dimensional vector Robp forms with a two-dimensional vector Vb in the second position, and $\beta$ being an angle which a two-dimensional vector Vb in the position forms with the two-dimensional vector Vb in the second position; a third comparative two-dimensional vector group generating unit for generating, for each of the plurality of positions in the first two-dimensional image aside from the third position, a comparative two-dimensional vector Raq composed of a component r and a component ($\alpha-\beta$), the component r being a magnitude of a two-dimensional vector Roaq which directs from the third position to the position, $\alpha$ being an angle which the two-dimensional vector Roaq forms with a two-dimensional vector Va in the third position, and $\beta$ being an angle which a two-dimensional vector Va in the position forms with the two-dimensional vector Va in the third position; a fourth comparative two-dimensional vector group generating unit for generating, for each of the plurality of positions in the second two-dimensional image aside from the fourth position, a comparative two-dimensional vector Rbq composed of a component r and a component ($\alpha-\beta$), the component r being a magnitude of a two-dimensional vector Robq which directs from the fourth position to the position, $\alpha$ being an angle which the two-dimensional vector Robq forms with a two-dimensional vector Vb in the fourth position, and $\beta$ being an angle which a two-dimensional vector Vb in the position forms with the two-dimensional vector Vb in the fourth position; and a judging unit for judging that the predetermined matching conditions are satisfied and accordingly the first two-dimensional image and the second two-dimensional image match, when in a distribution of a plurality of comparative two-dimensional vectors Rap generated by the first comparative two-dimensional vector group generating unit and in a distribution of a plurality of comparative two-dimensional vectors Rbp generated by the second comparative two-dimensional vector group generating unit, components ($\alpha-\beta$) of the plurality of comparative two-dimensional vectors Rap match components ($\alpha-\beta$) of the plurality of comparative two-dimensional vectors Rbp to a first predetermined degree, and components r of the plurality of comparative two-dimensional vectors Rap are proportional to components r of the plurality of comparative two-dimensional vectors Rbp to a second predetermined degree, and when in a distribution of a plurality of comparative two-dimensional vectors Raq generated by the third comparative two-dimensional vector group generating unit and in a distribution of a plurality of comparative two-dimensional vectors Rbq generated by the fourth comparative two-dimensional vector group generating unit, components ($\alpha-\beta$) of the plurality of comparative two-dimensional vectors Raq match components ($\alpha-\beta$) of the plurality of comparative two-dimensional vectors Rbq to the first predetermined degree, and components r of the plurality of comparative two-dimensional vectors Raq are proportional to components r of the plurality of comparative two-dimensional vectors Rbq to the second predetermined degree.

With this construction, two reference positions are set and two groups of comparative two-dimensional vectors are generated for each of two two-dimensional images. Then, two groups of comparative two-dimensional vectors generated for one image are compared with respective two groups of comparative two-dimensional vectors generated for the other image. If comparison results in a mismatch, a reference position of one of the two two-dimensional images is changed and the above procedure is repeated. As a result, two two-dimensional images that differ in sizes and orientations can be compared with each other with accuracy. Also, through use of comparative two-dimensional vectors, image matching can be performed without being affected by sampling errors that occur in a direction of a two-dimensional vector present in each reference position.

Here, the third reference specifying unit may specify a position that is most distant from the first position among the plurality of positions in the first two-dimensional image, as the third position, when a number of combinations of comparative two-dimensional vectors Rap and comparative two-dimensional vectors Rbp, obtained by detecting each comparative two-dimensional vector Rap whose component ($\alpha-\beta$) matches a component ($\alpha-\beta$) of any of the plurality of comparative two-dimensional vectors Rbp to a third predetermined degree, is no less than a predetermined value, and a ratio between a component r of a comparative two-dimensional vector Rap and a component r of a comparative two-dimensional vector Rbp in each of the combinations is constant to a fourth predetermined degree for all of the combinations.

With this construction, when a reference position of one two-dimensional image corresponds to the same part of the object as a reference position of the other two-dimensional image, another reference position of each two-dimensional image can be set easily regardless of whether the two images differ in sizes/orientations, since a position that is most distant from the reference position in each image is set as the other position. As a result, the number of computations necessary for image matching can be reduced.

Here, the second reference specifying unit may create, for each of the plurality of positions in the second two-dimensional image, a plurality of straight lines that each pass through the position and that each form an angle corresponding to a component ($\alpha$–$\beta$) of any of the plurality of comparative two-dimensional vectors Rap generated by the first comparative two-dimensional vector group generating unit, with a two-dimensional vector Vb present in the position, detect coordinates of a pixel where a largest number of straight lines pass through in the second two-dimensional image, and specify a position that is closest to the detected coordinates among the plurality of positions in the second two-dimensional image, as the second position.

With this construction, a reference position of one two-dimensional image that corresponds to a reference position of the other two-dimensional image may be selected more easily, with it being possible to reduce the number of computations necessary for image matching.

In this way, the present invention provides a valuable technique that can compare two images with different sizes and orientations using relatively simple processing, and so is particularly of use for matching images at high speed.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 shows the Haar basis used in the embodiments of the present invention;

FIG. 5 shows the state of data before a wavelet transforming unit 1300 performs two-dimensional orthogonal wavelet decomposition;

FIG. 6 shows the state of data after the wavelet transforming unit 1300 performs two-dimensional orthogonal wavelet decomposition once;

DESCRIPTION OF THE PREFERRED EMBODIMENTS

First Embodiment

The following is a description of an image recognition system 1000 as the first embodiment of an image matching apparatus of the present invention, with reference to the figures.

<Functional Configuration>

Figure 1A:
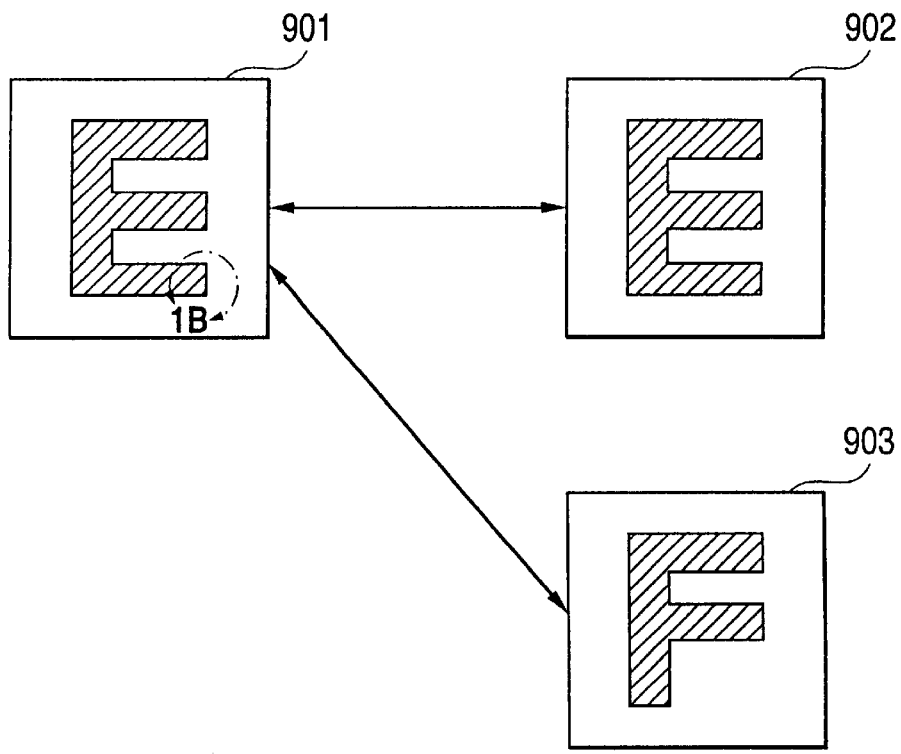
FIGS. 1A and 1B are a conceptual diagram showing image matching in a conventional technique.
Figure 1B:
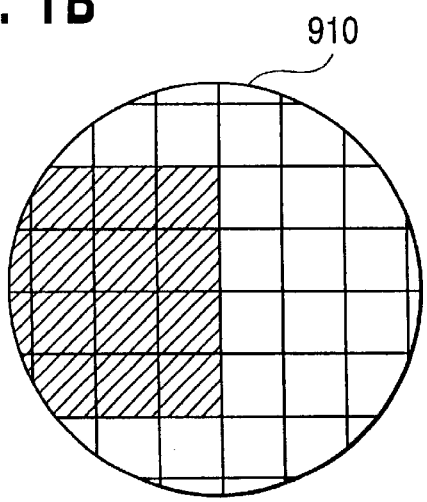
Figure 2:
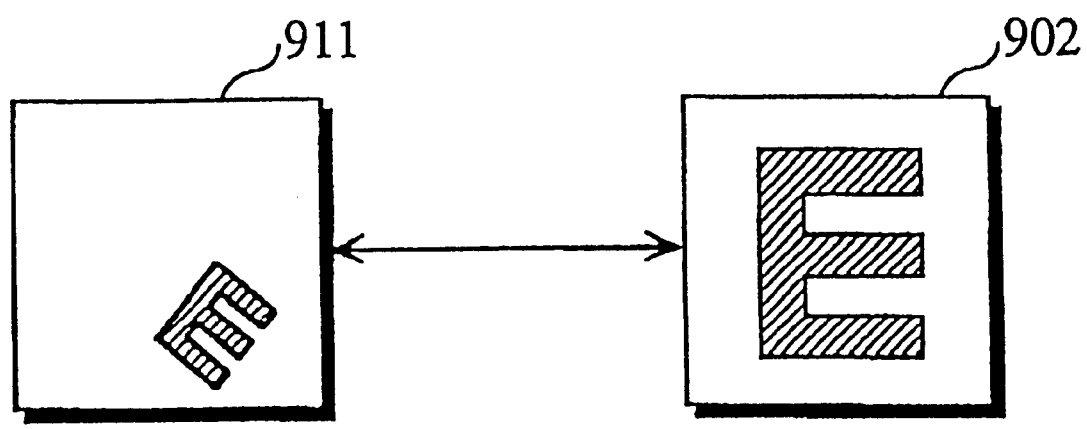
FIG. 2 shows examples of two images that differ in sizes and orientations.
Figure 3:
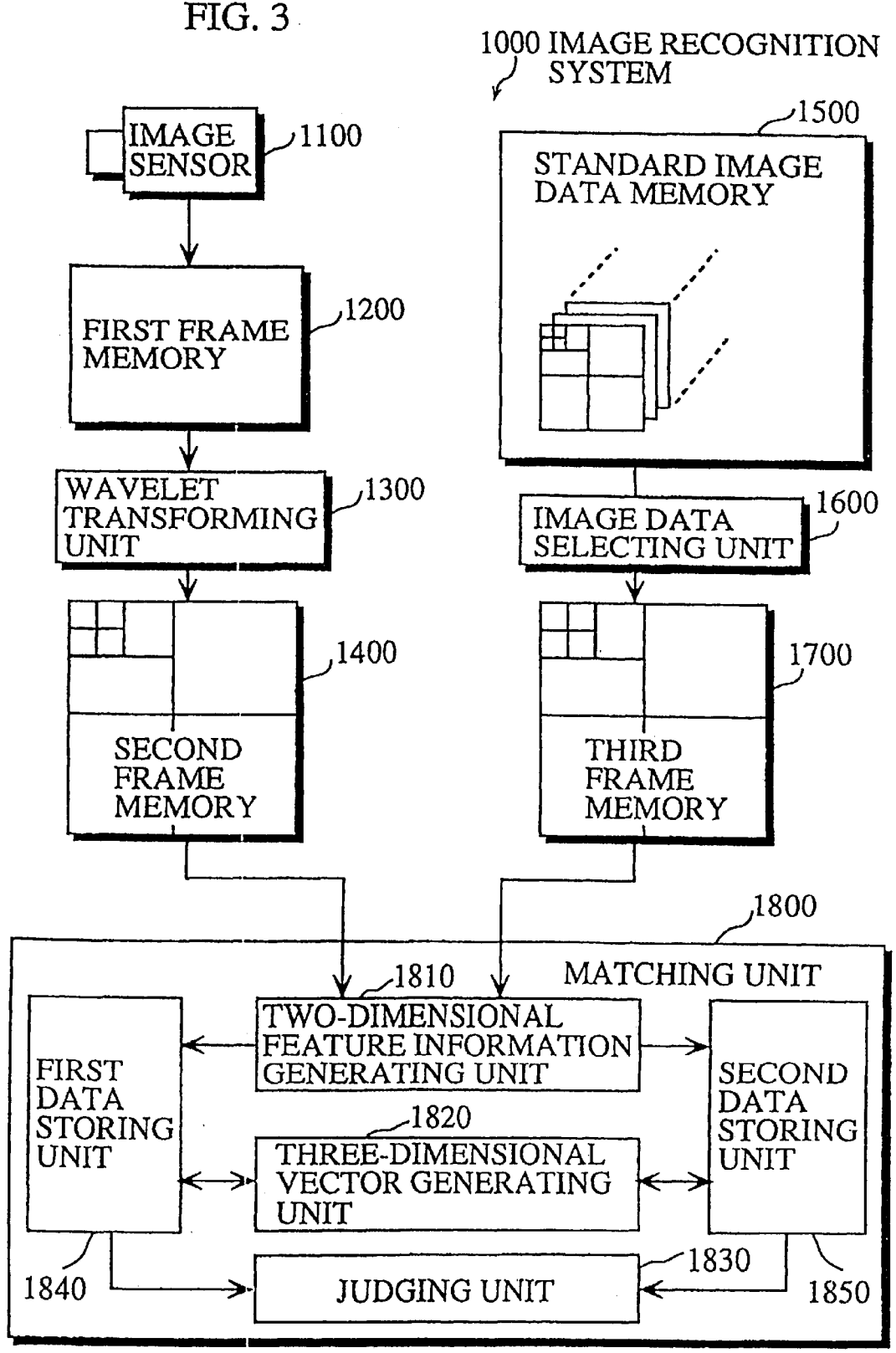
FIG. 3 shows the functional configuration of an image recognition system 1000 of the first embodiment of the present invention.

FIG. 3 shows the functional configuration of the image recognition system 1000 of the first embodiment.

The image recognition system 1000 recognizes a captured image by comparing the captured image data with preset standard image data and judging whether the captured image matches the standard image. An image sensor 1100, a first frame memory 1200, a wavelet transforming unit 1300, a second frame memory 1400, a standard image data memory 1500, an image data selecting unit 1600, a third frame memory 1700, and a matching unit 1800 are included in the image recognition system 1000.

The standard image data memory 1500 is a memory where a plurality of sets of standard image data used for image matching are stored in advance, these plurality of sets of standard image data each having been generated as a result of performing two-dimensional orthogonal wavelet decomposition (described later) on a set of standard image data. In this specification, the result obtained by performing operations on image data is also called image data, as such obtained image data derives from the original image.

The first frame memory 1200 is a memory for storing a set of image data, while the second frame memory 1400 and the third frame memory 1700 are memories for storing a set of image data generated as a result of two-dimensional orthogonal wavelet decomposition.

The image sensor 1100 is a device, such as a digital camera, that captures a physical object, generates a set of digital image data by sampling and quantization, and stores the set of image data in the first frame memory 1200.

Note that the image recognition system 1000 is implemented via a computer except for the image sensor 1100, where the wavelet transforming unit 1300, the image data selecting unit 1600, and the matching unit 1800 are software-controlled with a program in a memory being executed by a CPU.

The wavelet transforming unit 1300 performs two-dimensional orthogonal wavelet decomposition on the set of image data in the first frame memory 1200 using the Haar basis (see FIG. 4) to calculate spatial gradients, and stores the set of image data with the spatial gradients in the second frame memory 1400.

The image data selecting unit 1600 selects, when required, one set of standard image data at a time from the standard image data memory 1500 as a matching target, and stores the set of standard image data in the third frame memory 1700.

The matching unit 1800 compares the set of image data in the second frame memory 1400 with the set of standard image data in the third frame memory 1700 to judge whether the captured image matches the standard image. The matching unit 1800 is roughly made up of a first data storing unit 1840 as a memory, a second data storing unit 1850 as a memory, a two-dimensional feature information generating unit 1810, a three-dimensional vector generating unit 1820, and a judging unit 1830. The two-dimensional feature information generating unit 1810 generates two-dimensional feature information (described later) for each of the two sets of image data in the second frame memory 1400 and the third frame memory 1700, and stores the two-dimensional feature information generated for the set of image data in the second frame memory 1400 and the two-dimensional feature information generated for the set of image data in the third frame memory 1700 respectively in the first data storing unit 1840 and the second data storing unit 1850. The three-dimensional vector generating unit 1820 generates a three-dimensional vector group (described later) for each of the two sets of image data, and the judging unit 1830 compares the generated three-dimensional vector groups to judge whether the two sets of image data match.

<Wavelet Transformation>

Two-dimensional orthogonal wavelet decomposition by the wavelet transforming unit 1300 will be explained below.

FIG. 4 shows the Haar basis used in the embodiments of the present invention.

The wavelet transforming unit 1300 performs two-dimensional orthogonal wavelet decomposition through use of the Haar basis that is expressed by the scaling function and the mother wavelet function shown in the figure.

FIG. 5 shows the state of data before the wavelet transforming unit 1300 performs two-dimensional orthogonal wavelet decomposition, while FIG. 6 shows the state of data after the wavelet transforming unit 1300 performs two-dimensional orthogonal wavelet decomposition once.

Data shown in FIGS. 5 and 6 concerns a set of image data composed of 2N×2N sets of pixel data, where the values $A_{1,1}, A_{1,2}, \ldots$, and $A_{2N,2N}$ each represent an intensity level of a set of pixel data. Note that each value shown in FIG. 6 is actually multiplied by ¼, though the coefficient ¼ is omitted in the figure.

By two-dimensional orthogonal wavelet decomposition, a set of image data is decomposed into low frequency MRA (MultiResolution Approximation) components and high frequency MRR (MultiResolution Representation) components.

Details on this two-dimensional orthogonal wavelet decomposition will be given below.

Suppose $2^n \times 2^n$ sets of pixel data in a set of image data are spaced uniformly between 0 and 1 in both horizontal and vertical directions. Here, data in a given line, such as the "v"th line in FIG. 5, can be expressed using the scaling function $\phi(t)$ as follows:

$$f_n(x) = \Sigma A_{v,u} \phi(2^n x - u) \tag{Formula 1}$$

where $f_n(x)$ is the sum total when u takes on integers that satisfy $0 \le u \le (2^n - 1)$.

Then, $f_n(x)$ is decomposed into $f_{n-1}(x)$ and $g_{n-1}(x)$ by wavelet decomposition as follows:

$$f_n(x) = f_{n-1}(x) + g_{n-1}(x) \tag{Formula 2}$$

where $f_{n-1}(x)$ and $g_{n-1}(x)$ are expressed respectively as $$f_{n-1}(x) = \Sigma C_{v,u} \phi(2^{n-1} x - u) \ [0 \le u \le (2^{n-1} - 1)] \tag{Formula 3}$$

$$g_{n-1}(x) = \Sigma D_{v,u} \psi(2^{n-1} x - u) \ [0 \le u \le (2^{n-1} - 1)] \tag{Formula 4}$$

where the coefficients $C_{v,u}$ and $D_{v,u}$ are expressed respectively as $$C_{v,u} = (A_{v,u} + A_{v,u+1})/2 \tag{Formula 5}$$

$$D_{v,u} = (A_{v,u} - A_{v,u+1})/2 \tag{Formula 6}$$

The above wavelet decomposition for a given line also applies to a given column. Accordingly, data in the vertical coordinate y in the "v"th line of the horizontal coordinate x in the "u"th column is expressed using the scaling function $\phi(t)$ as follows:

$$f_n(x,y) = f_n(x) \cdot \phi(2^n y - v) \tag{Formula 7}$$

where the coordinate y is within the range of coordinates in the "v"th line.

When $f_n(x,y)$ is generalized, the result will be expressed as $$f_n(x,y) = \Sigma f_n(x) \cdot \phi(2^n y - v) \tag{Formula 8}$$

where $f_n(x,y)$ is the sum total when v takes on integers that satisfy $0 \le v \le (2^n - 1)$ Then, $f_n(x,y)$ is decomposed into $f_{n-1}(x,y)$ and $g_{n-1}(x,y)$ by wavelet decomposition as follows:

$$f_n(x,y) = f_{n-1}(x,y) + g_{n-1}(x,y) \tag{Formula 9}$$

where $f_{n-1}(x,y)$ and $g_{n-1}(x,y)$ are expressed respectively as $$f_{n-1}(x,y) = \Sigma CC_{v,u} \phi(2^{n-1} y - v) \ [0 \le v \le (2^{n-1} - 1)] \tag{Formula 10}$$

$$g_{n-1}(x,y) = \Sigma DD_{v,u} \psi(2^{n-1} y - v) \ [0 \le v \le (2^{n-1} - 1)] \tag{Formula 11}$$

where the coefficients $CC_{v,u}$ and $DD_{v,u}$ are expressed respectively as $$CC_{v,u} = (f_n(x)_v + f_n(x)_{v+1})/2 \tag{Formula 12}$$

$$DD_{v,u} = (f_n(x)_v - f_n(x)_{v+1})/2 \tag{Formula 13}$$

The above Formulas 12 and 13 can be expanded using Formulas 2, 3 and 4, as shown in Formulas 14–19 below. Since it is not necessary to calculate the sum total when the "v"th line and the "u"th column are known, $\Sigma$ is not included in the formulas below.

The coefficient $CC_{v,u}$ in Formula 12 is expanded to $$CC_{v,u} (f_{n-1}(x)_v + g_{n-1}(x)_v + f_{n-1}(x)_{v+1} + g_{n-1}(x)_{v+1})/2 \tag{Formula 14}$$

and to $$CC_{u,v} = (C_{v,u} \phi(2^{n-1} x - u) + D_{v,u} \psi(2^{n-1} x - u) + C_{v+1,u} \phi(2^{n-1} x - u) + D_{v+1,u} \psi(2^{n-1} x - u))/2 \tag{Formula 15}$$

and further to $$CC_{v,u} = \{(C_{v,u} + C_{v+1,u}) \phi(2^{n-1} x - u) + (D_{v,u} + D_{v+1,u}) \psi(2^{n-1} x - u)\}/2 \tag{Formula 16}$$

Equally, the coefficient $DD_{v,u}$ in Formula 13 is expanded to $$DD_{v,u} = (f_{n-1}(x)_v + g_{n-1}(x)_v - f_{n-1}(x)_{v+1} - g_{n-1}(x)_{v+1})/2 \tag{Formula 17}$$

and to $$DD_{v,u} = (C_{v,u} \phi(2^{n-1} x - u) + D_{v,u} \psi(2^{n-1} x - u) - C_{v+1,u} \phi(2^{n-1} x - u) - D_{v+1,u} \psi(2^{n-1} x - u))/2 \tag{Formula 18}$$

and further to $$DD_{v,u} = \{(C_{v,u} - C_{v+1,u}) \phi(2^{n-1} x - u) + (D_{v,u} - D_{v+1,u}) \psi(2^{n-1} x - u)\}/2 \tag{Formula 19}$$

As a result, when the "v"th line and the "u"th line are arbitrary, $f_n(x,y)$ in Formula 9 is expressed using Formulas 10, 11, 16 and 19 as follows:

$$f_n(x,y)=\Sigma\Sigma\{(C_{v,u}+C_{v+1,u})\phi_x\phi_y+(D_{v,u}+D_{v+1,u})\psi_x\phi_y+(C_{v,u}-C_{v+1,u})\phi_x\psi_y+(D_{v,u}-D_{v+1,u})\psi_x\psi_y\}/2 \quad \text{(Formula 20)}$$

where $\phi_x\phi_y$, $\psi_x\phi_y$, $\phi_x\psi_y$, and $\psi_x\psi_y$ are expressed respectively as $$\phi_x\phi_y=\phi(2^{n-1}x-u)\phi(2^{n-1}y-v) \quad \text{(Formula 21)}$$

$$\psi_x\phi_y=\psi(2^{n-1}x-u)\phi(2^{n-1}y-v) \quad \text{(Formula 22)}$$

$$\phi_x\psi_y=\phi(2^{n-1}x-u)\psi(2^{n-1}y-v) \quad \text{(Formula 23)}$$

$$\psi_x\psi_y=\psi(2^{n-1}x-u)\psi(2^{n-1}y-v) \quad \text{(Formula 24)}$$

Then, Formula 20 is transformed into $$f_n(x,y)=\Sigma\Sigma(k11\phi_x\phi_y+k12\psi_x\phi_y+k21\phi_x\psi_y+k22\psi_x\psi_y) \quad \text{(Formula 25)}$$

where the coefficients k11, k12, k21, and k22 are expressed respectively as $$k11=(A_{v,u}+A_{v,u+1}+A_{v+1,u}+A_{v+1,u+1})/4 \quad \text{(Formula 26)}$$

$$k12=(A_{v,u}-A_{v,u+1}+A_{v+1,u}-A_{v+1,u+1})/4 \quad \text{(Formula 27)}$$

$$k21=(A_{v,u}+A_{v,u+1}-A_{v+1,u}-A_{v+1,u+1})/4 \quad \text{(Formula 28)}$$

$$k22=(A_{v,u}-A_{v,u+1}-A_{v+1,u}+A_{v+1,u+1})/4 \quad \text{(Formula 29)}$$

Here, k11 in Formula 26 denotes a mean value of four sets of pixel data and is roughly equivalent to lowpass filtering on image signals in the vertical and horizontal directions. k12 in Formula 27 denotes a spatial gradient of the four sets of pixel data in the horizontal direction, since the difference in the horizontal direction is calculated, while k21 in Formula 28 denotes a spatial gradient of the four sets of pixel data in the vertical direction, since the difference in the vertical direction is calculated. Meanwhile, k22 in Formula 29 represents distortion of the four sets of pixel data.

Accordingly, the data shown in FIG. 6 is a MRA component, a horizontal MRR component (spatial gradient), a vertical MRR component (spatial gradient) and a diagonal MRR component for each four pixels that have been decomposed by two-dimensional orthogonal wavelet decomposition.

<Operation>

The operation of the image recognition system 1000 will be explained below.

Figure 7:
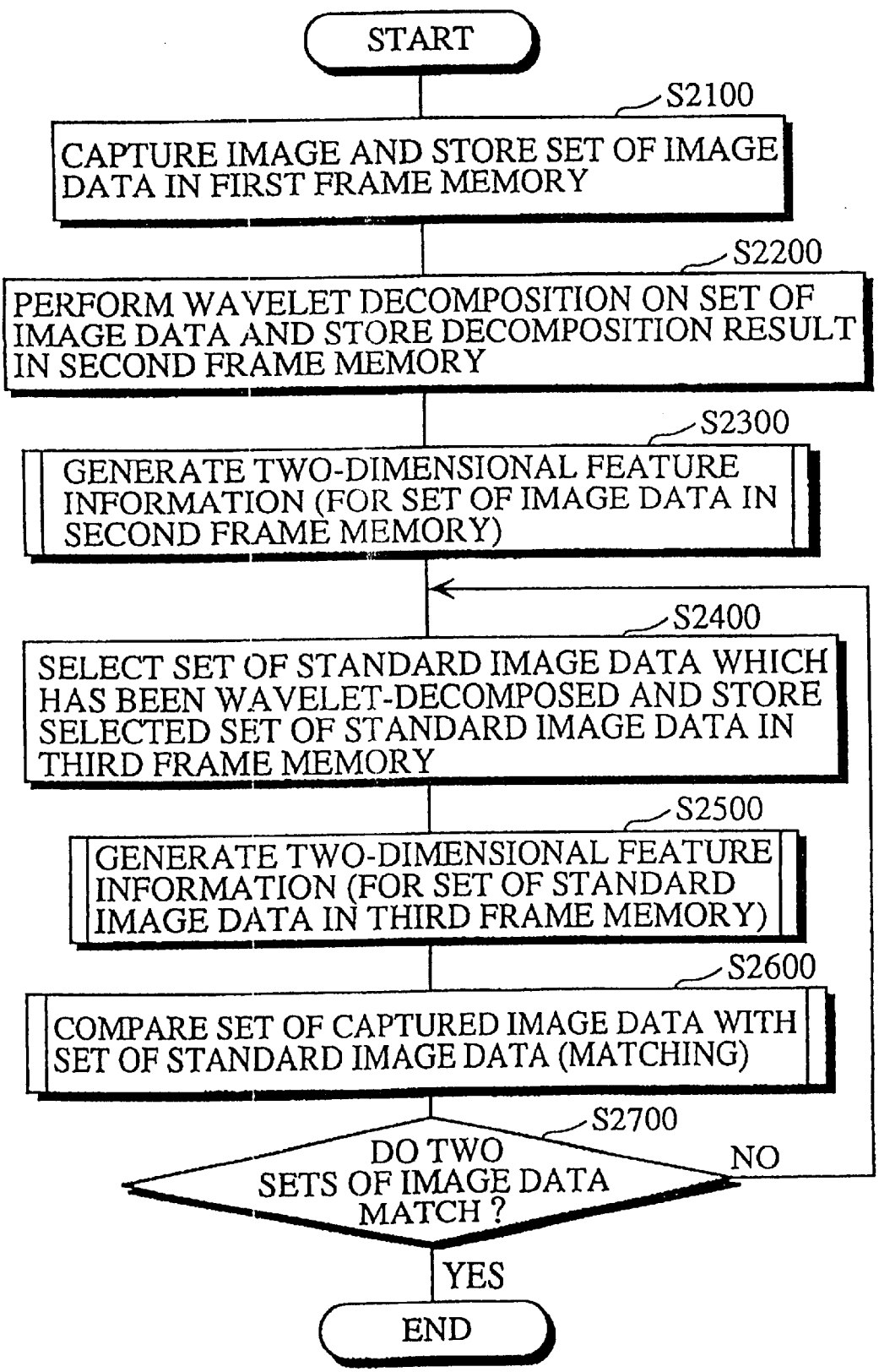
FIG. 7 is a flowchart showing the operation of the image recognition system 1000.

FIG. 7 is a flowchart showing the operation of the image recognition system 1000.

The operation of the image recognition system 1000 can be roughly divided into: steps S2100, S2200 and S2300 where two-dimensional orthogonal wavelet decomposition is performed on a set of image data of an image captured by the image sensor 1100 and two-dimensional feature information showing features of the set of image data is generated from the set of captured image data; steps S2400 and S2500 where one of a plurality of sets of standard image data on which two-dimensional orthogonal wavelet decomposition has been performed is selected as a matching target and two-dimensional feature information is generated from the set of standard image data; and steps S2600 and S2700 where the set of captured image data is compared with the set of standard image data using the two-dimensional feature information to judge whether they match.

This operation of the image recognition system 1000 will be described step by step below.

The image sensor 1100 captures an image and stores a set of image data in the first frame memory 1200 (S2100).

The wavelet transforming unit 1300 performs wavelet decomposition on the set of image data in the first frame memory 1200, and stores the obtained set of image data in the second frame memory 1400 (S2200). Here, the wavelet transforming unit 1300 performs wavelet decomposition m times, though the data shown in FIG. 6 is the result obtained after the wavelet transforming unit 1300 performs wavelet decomposition once. In other words, in step S2200 the wavelet transforming unit 1300 repeats the process of performing wavelet decomposition on the result (MRA component) of immediately preceding wavelet decomposition (m−1) times.

Here, the value m has been set beforehand in consideration of factors such as the difference between the size of the set of captured image data and the size of the set of standard image data. For instance, m is determined so that the data size of horizontal and vertical MRR components obtained by repeating wavelet decomposition on the set of captured image data m times will become roughly equivalent to the data size of horizontal and vertical MRR components of the set of standard image data which has already been wavelet-decomposed.

Once the wavelet transforming unit 1300 has performed wavelet decomposition on the set of image data m times and stored the obtained set of image data in the second frame memory 1400, the two-dimensional feature information generating unit 1810 generates two-dimensional feature information for the set of image data in the second frame memory 1400, based on the horizontal MRR components and vertical MRR components of the set of image data (S2300).

The processing of generating two-dimensional feature information will be explained below, with reference to FIGS. 8–10.

Figure 8:
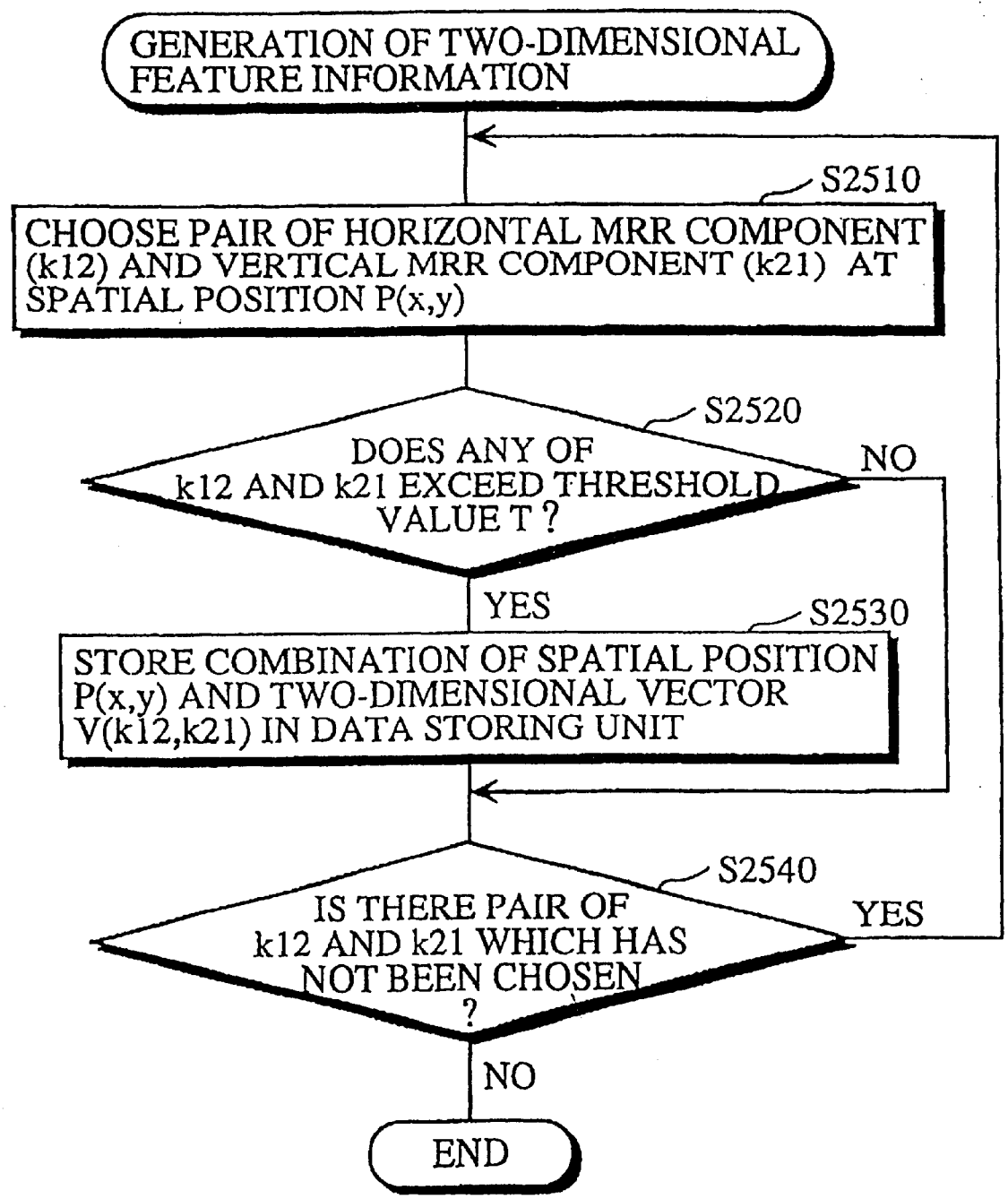
FIG. 8 is a flowchart showing the processing of generating two-dimensional feature information.
Figure 9:
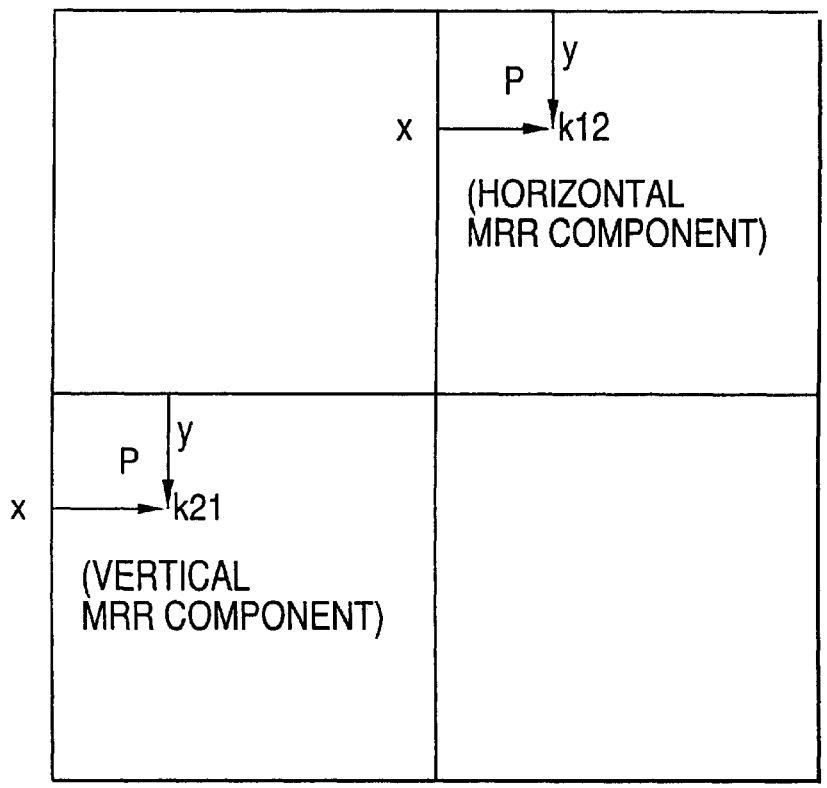
FIG. 9 is a conceptual diagram showing a horizontal MRR component and a vertical MRR component for a spatial position P(x,y)

FIG. 8 is a flowchart showing the processing of generating two-dimensional feature information, while FIG. 9 is a conceptual diagram showing a horizontal MRR component and vertical MRR component at a spatial position P(x,y).

The two-dimensional feature information generating unit 1810 chooses a pair of horizontal MRR component (k12) and vertical MRR component (k21) (see FIG. 9) at a spatial position P(x,y) (S2510). If any of k12 and k21 exceeds a predetermined threshold value T (S2520), the two-dimensional feature information generating unit 1810 stores a combination of the spatial position P(x,y) and the two-dimensional vector V(k12,k21) in a data storing unit (S2530). If neither k12 nor k21 exceeds the threshold value T, the two-dimensional feature information generating unit 1810 does not store anything in the data storing unit. The two-dimensional feature information generating unit 1810 then changes x or y, chooses another spatial position P(x,y) (S2540), and repeats the above procedure (steps S2510~S2530). On completing this procedure for all spatial positions P(x,y), the two-dimensional feature information generating unit 1810 completes the processing. As a result, a plurality of combinations of spatial positions P(x,y) and two-dimensional vectors V(k12,k21) are stored in the data storing unit as two-dimensional feature information of a set of image data.

The data storing unit mentioned here is either the first data storing unit 1840 or the second data storing unit 1850. When two-dimensional feature information is generated from a set of image data in the second frame memory 1400, the two-dimensional feature information is stored in the first data storing unit 1840. On the other hand, when two-dimensional feature information is generated from a set of image data in the third frame memory 1700, the two-dimensional feature information is stored in the second data storing unit 1850.

Here, a two-dimensional vector V(k12,k21) denotes a vector composed of a horizontal MRR component (k12) and a vertical MRR component (k21) on any spatial position P(x,y). Hereafter a spatial position P(x,y) is also referred to as P, a two-dimensional vector V(k12,k21) as V, and a plurality of two-dimensional vectors V(k12,k21) as a group of two-dimensional vectors V.

Figure 10A:
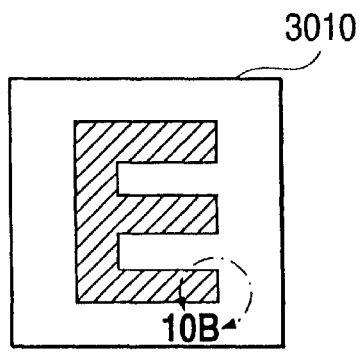
FIGS. 10A and 10B show spatial gradients on a part of the character "E".
Figure 10B:
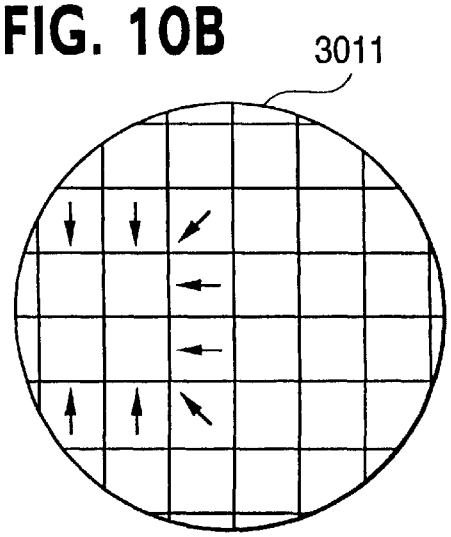

FIGS. 10A and 10B show spatial gradients on a part of the character "E".

The arrows in a magnified view 3011 in FIG. 10 indicate a group of two-dimensional vectors V whose components (k12 and/or k21) are larger than the threshold value T, wherein each two-dimensional vector V is placed in a corresponding spatial position P(x,y). In the figure, components of the two-dimensional vectors V on the edge of the character "E" are larger than the threshold value T.

Thus, by extracting horizontal or vertical spatial gradients that are larger than the threshold value, the two-dimensional feature information generating unit 1810 generates data relating to features present in the edge of an image.

After the two-dimensional feature information generating unit 1810 generates the two-dimensional feature information for the set of image data in the second frame memory 1400 (S2300), the image data selecting unit 1600 selects one of the plurality of sets of wavelet-transformed standard image data from the standard image data memory 1500 and stores the set of standard image data in the third frame memory 1700 (S2400).

The two-dimensional feature information generating unit 1810 then generates two-dimensional feature information from the set of standard image data in the third frame memory 1700 (S2500) (see FIG. 8).

Once the two-dimensional feature information generating unit 1810 has stored two-dimensional feature information (combinations of spatial positions P(x,y) and two-dimensional vectors V(k12,k21)) of the set of captured image data and the set of standard image data respectively in the first data storing unit 1840 and the second data storing unit 1850 (S2300 and S2500), the matching unit 1800 has the three-dimensional vector generating unit 1820 and the judging unit 1830 perform matching processing for the set of captured image data and the set of standard image data (S2600). If they do not match (S2700), another set of standard image data is selected from the standard image data memory 1500 and steps S2400, S2500, and S2600 are repeated. This procedure is repeated for every set of standard image data in the standard image data memory 1500 until a set of standard image data that matches the set of captured image data is found. If the set of captured image data does not match any of the plurality of sets of standard image data in the standard image data memory 1500, the image recognition system 1000 ends the operation shown in FIG. 7, judging that the captured image does not match any of the standard images.

When a set of standard image data that matches the set of captured image data is found in step S2700, the image recognition system 1000 completes the operation.

After the matching processing, the image recognition system 1000 notifies whether the captured image has been successfully recognized via a display or other means, though such a process is omitted in FIG. 7.

The above matching processing will be explained in details below, with reference to FIGS. 11–13.

Figure 11:
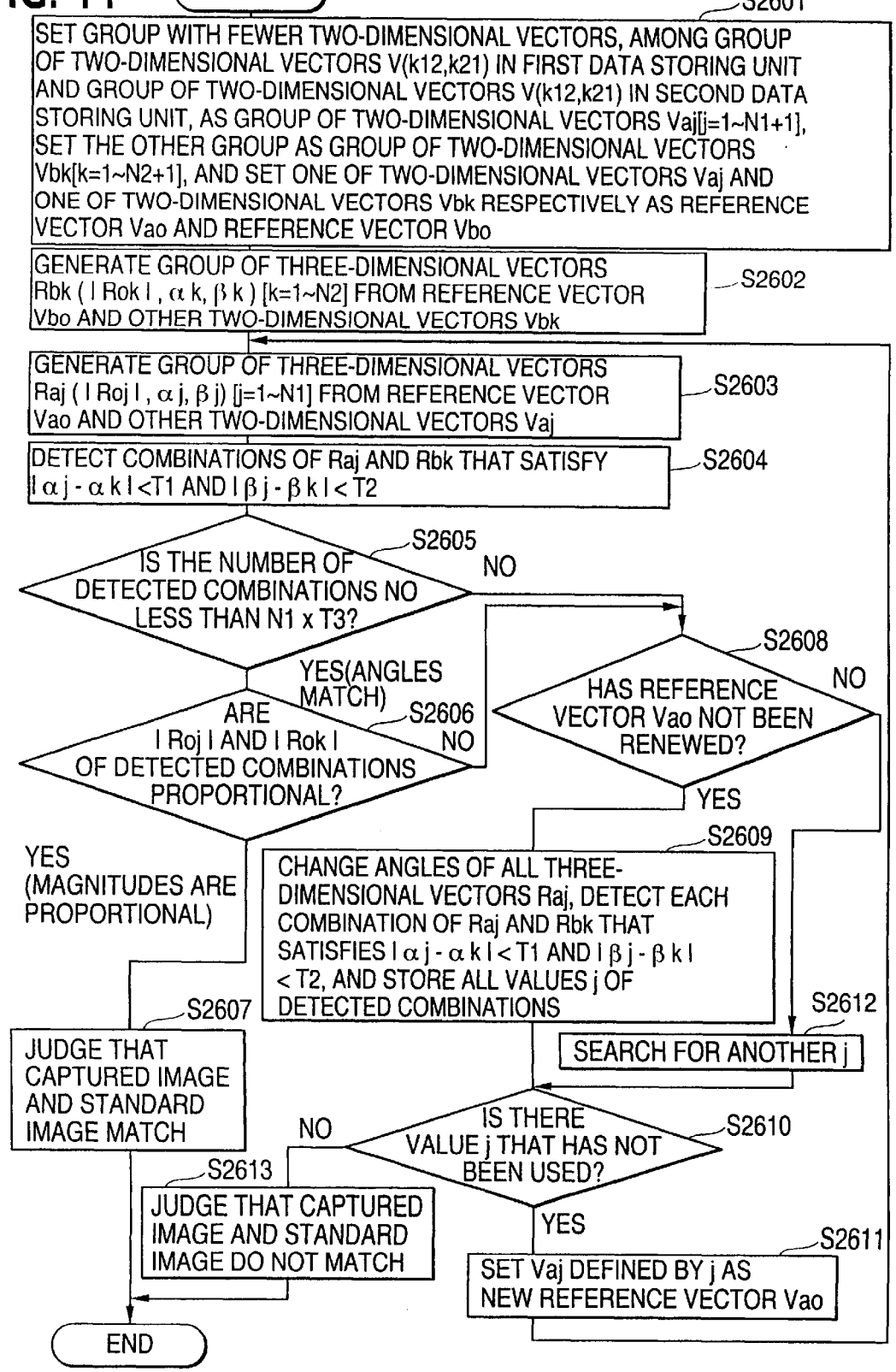
FIG. 11 is a flowchart showing the matching processing of the image recognition system 1000.

FIG. 11 is a flowchart showing the matching processing.

The three-dimensional vector generating unit 1820 compares the number of two-dimensional vectors V(k12,k21) in the first data storing unit 1840 with the number of two-dimensional vectors V(k12,k21) in the second data storing unit 1850. Suppose the number of two-dimensional vectors V in the first data storing unit 1840 is smaller than the number of two-dimensional vectors V in the second data storing unit 1850. The group of (N1+1) two-dimensional vectors V in the first data storing unit 1840 is set as a group of two-dimensional vectors Vaj(k12,k21) [j=1~N1+1], while the group of (N2+1) two-dimensional vectors V in the second data storing unit 1850 is set as a group of two-dimensional vectors Vbk(k12,k21) [k=1~N2+1]. Also, a spatial position P(x,y) of a two-dimensional vector Vaj (k12,k21) is set as a spatial position Paj (x,y), while a spatial position P(x,y) of a two-dimensional vector Vbk(k12,k21) is set as a spatial position Pbk(x,y). In the following description, Vaj(k12,k21) is also referred to as Vaj, Vbk(k12, k21) as Vbk, Paj(x,y) as Paj, and Pbk(x,y) as Pbk.

The three-dimensional vector generating unit 1820 selects one of the two-dimensional vectors Vaj as a reference vector Vao, and selects one of the two-dimensional vectors Vbk as a reference vector Vbo (S2601).

Here, the reference vector Vao is selected from two-dimensional vectors Vaj(k12,k21) whose |k12|+|k21| s largest in the group of two-dimensional vectors Vaj. Similarly, the reference vector Vbo is selected from two-dimensional vectors Vbk(k12,k21) whose |k12|+|k21| is largest in the group of two-dimensional vectors Vbk.

In generation of two-dimensional feature information, the two-dimensional feature information generating unit 1810 has limited the number of two-dimensional vectors V using the threshold value T. By doing so, when a captured image and a standard image concern the same object, it can be ensured that, among the distinctive features extracted for the set of captured image data and the distinctive features extracted for the set of standard image data, at least one combination of a distinctive feature of the set of captured image data and a distinctive feature of the set of standard image data correspond to the same part of the object.

Accordingly, the reference vectors Vao and Vbo are provisionally selected in step S2601, on the assumption that such reference vectors would correspond to the same part of the object.

A spatial position of the reference vector Vao is hereinafter referred to as Pao(x,y), and a spatial position of the reference vector vbo as Pbo(x,y).

After selecting the reference vectors Vao and Vbo, the three-dimensional vector generating unit 1820 generates a group of N2 three-dimensional vectors Rbk(|Rok|,αk,βk) [k=1~N2] from the reference vector Vbo and two-dimensional vectors Vbk other than Vbo (S2602).

The three-dimensional vector generating unit 1820 also generates a group of Ni three-dimensional vectors Raj(|Roj|, αj,βj) [j=1~N1] from the reference vector Vao and two-dimensional vectors Vaj other than Vao (S2603) (a three-dimensional vector Raj (|Roj|,αj,βj) and a three-dimensional vector Rbk(|Rok|,αk,βk) are hereinafter also referred to as a three-dimensional vector Raj and a three-dimensional vector Rbk, respectively).

The generated group of three-dimensional vectors Raj and group of three-dimensional vectors Rbk are then respectively stored in the first data storing unit 1840 and the second data storing unit 1850.

The detailed procedure of generating three-dimensional vectors Raj will be given below.

Figure 12:
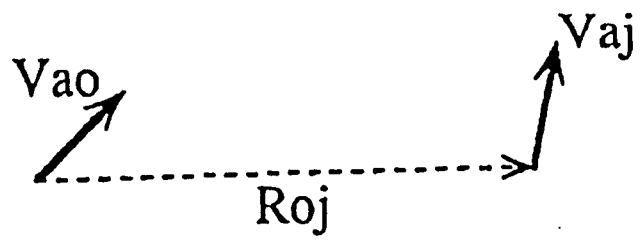
FIG. 12 shows a reference vector Vao and a two-dimensional vector Vaj.

FIG. 12 shows a reference vector Vao(k12,k21) present in a spatial position Pao (x,y) and a two-dimensional vector Vaj (k12,k21) present in a spatial position Paj (x,y).

In the figure, x coordinates of the spatial positions Paj and Pao and components k12 (spatial gradients in the horizontal direction) of the two-dimensional vectors Vaj and Vao are set as vector components in the first direction, while y coordinates of Paj and Pao and components k21 (spatial gradients in the vertical direction) of Vaj and Vao are set as vector components in the second direction that is perpendicular to the first direction. A vector Roj from the spatial position Pao to the spatial position Paj is also shown in the figure.

A three-dimensional vector Raj (|Roj|,αj,βj) is composed of a magnitude |Roj| of the vector Roj, an angle αj which the vector Roj forms with the reference vector Vao, and an angle βj which the two-dimensional vector Vaj forms with the reference vector Vao.

The angles αj and βj are calculated as follows:

$$\alpha j = \arctan((|Roj \times Vao|)/(Roj \cdot Vao)) \quad \text{(Formula 30)}$$

$$\beta j = \arctan((|Vaj \times Vao|)/(Vaj \cdot Vao)) \quad \text{(Formula 31)}$$

where $-\pi/2 < \alpha j \leq \pi/2$ and $-\pi/2 < \beta j \leq \pi/2$. Here, $\alpha j = \pi/2$ when the denominator in Formula 30 is 0, while $\beta j = \alpha/2$ when the denominator in Formula 31 is 0. In the above formulas, arctan denotes inverse tangent, × denotes vector outer product, and · denotes vector inner product.

Figure 13:
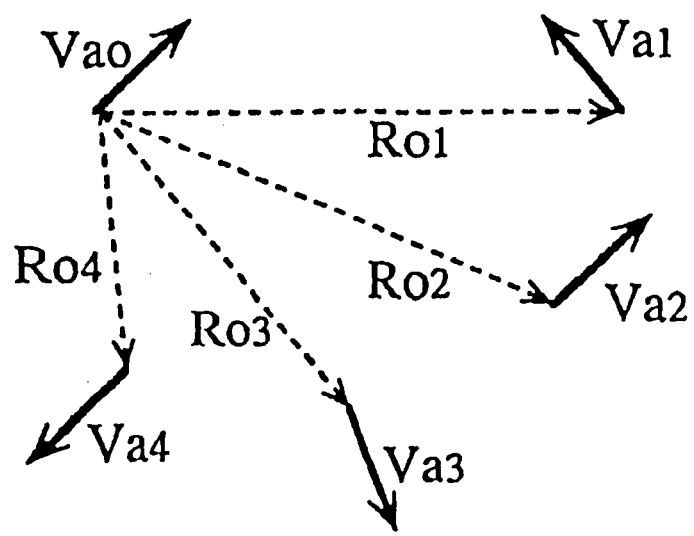
FIG. 13 shows the reference vector Vao and a plurality of two-dimensional vectors Vaj.

FIG. 13 shows the reference vector Vao and a plurality of two-dimensional vectors Vaj.

When a vector from the origin of the reference vector Vao to the origin of a two-dimensional vector Va1 is set as Ro1, a three-dimensional vector Ra1 is composed of |Ro1|, an angle α1 formed by Roz1 with Vao, and an angle β1 formed by Va1 with Vao. Similarly, a three-dimensional vector Ra2 is composed of |Ro2|, α2, and β2. The other three-dimensional vectors are generated in the same way.

In other words, the group of three-dimensional vectors Raj is generated by expressing the other two-dimensional vectors Vaj present in spatial positions Paj relative to the point and direction of the reference vector Vao present in the spatial position Pao. Note here that information on the magnitude of each two-dimensional vector Vaj is not included in the group of three-dimensional vectors Raj.

Three-dimensional vectors Rbk can be generated in the same way as the above three-dimensional vectors Raj.

Once the group of three-dimensional vectors Raj and the group of three-dimensional vectors Rbk have been generated by the three-dimensional vector generating unit 1820, the judging unit 1830 performs matching for the group of three-dimensional vectors Raj [j=1~N1] and the group of three-dimensional vectors Rbk [k=1~N2], by judging whether the two groups have matching angles and whether magnitudes of the two groups are proportional. Here, to have matching angles means that angle components of the group of three-dimensional vectors Raj match angle components of the group of three-dimensional vectors Rbk. Details of this judgement on angles and magnitudes will be given below.

The judging unit 1830 detects each combination of a three-dimensional vector Raj and a three-dimensional vector Rbk, among the group of three-dimensional vectors Raj and the group of three-dimensional vectors Rbk, that satisfies |αj−αk|<T1 and |βj−βk|<T2 (S2604). If the number of such combinations is no less than N1×T3 (S2605), the judging unit 1830 judges that the group of three-dimensional vectors Raj and the group of three-dimensional vectors Rbk have matching angles.

Here, T1, T2, and T3 are predetermined threshold values, such as T1=π/18, T2=π/18, and T3=0.9. In step S2604, each combination of Raj and Rbk that satisfies the above inequalities is searched by setting the value j of Raj and incrementing the value k of Rbk from 1 to N2 by 1. When such a combination is found, the value j is renewed and the same procedure is repeated. Which is to say, it is sufficient to find one three-dimensional vector Rbk for each three-dimensional vector Raj.

On judging that the group of three-dimensional vectors Raj and the group of three-dimensional vectors Rbk have matching angles, the judging unit 1830 judges, for all of the combinations detected in step S2604, whether components |Roj| and components |Rok| are proportional (S2606).

This judgement on magnitudes is performed to verify whether the two images represented by the group of three-dimensional vectors Raj and the group of three-dimensional vectors Rbk are geometrically similar. When components |Roj| and |Rok| of every combination of Raj and Rbk detected in step S2604 are set as C1 and D1, C2 and D2, C3 and D3, . . . , Cn and Dn, y is calculated according to $$\gamma = (\Sigma C_i \cdot D_i)/(\sqrt{\Sigma C_i^2} \cdot \sqrt{\Sigma D_i^2})[i=1\sim n] \quad \text{(Formula 32)}$$

When γ approximates to 1, it is judged that magnitudes of the group of three-dimensional vectors Raj and magnitudes of the group of three-dimensional vectors Rbk are proportional. Here, the range of values (such as 0.9~1.1) approximating to 1 has been determined in advance by the judging unit 1830.

On judging that magnitudes of the group of three-dimensional vectors Raj and magnitudes of the group of three-dimensional vectors Rbk are proportional, the judging unit 1830 judges that the captured image and the standard image match (S2607) and completes the matching processing.

Thus, when the three-dimensional vectors Raj and the three-dimensional vectors Rbk are distributed so that angle components αj and βj match angle components αk and βk to some extent and magnitude components |Roj| are proportional to magnitude components |Rok| to some extent, it is judged that the captured image and the standard image match.

Suppose, on the other hand, the judging unit 1830 judges in step S2605 that the group of three-dimensional vectors Raj and the group of three-dimensional vectors Rbk do not have matching angles, or judges in step S2606 that the group of three-dimensional vectors Raj and the group of three-dimensional vectors Rbk are not geometrically similar. If the reference vector Vao has not been changed since it was selected in step S2601 (S2608), angles of all of the three-dimensional vectors Raj [j=1~N1] are changed, and each combination of a three-dimensional vector Raj and a three-dimensional vector Rbk that satisfies |αj−αk|<T1 and |βj−βk|<T2 is detected. Then all values j of the detected combinations are stored in the first data storing unit 1840 (S2609).

Here, the angles of the N1 three-dimensional vectors Raj are changed by setting (π+αj−βj) of each three-dimensional vector Raj as new αj and setting −βj of each three-dimensional vector Raj as new βj.

When such a value j that satisfies the above inequalities cannot be found at all in step S2609, it is judged that the captured image and the standard image do not match (S2613) and the matching processing is terminated.

When, on the other hand, at least one value j that satisfies the inequalities is detected (S2610), one of the detected values j is chosen and the reference vector Vao is replaced with a two-dimensional vector Vaj defined by the chosen value j. Once the two-dimensional vector Vaj has thus been set as a new reference vector Vao (S2611), the processing returns to steps S2603~S2606 where the three-dimensional vector generating unit 1820 newly generates a group of three-dimensional vectors Raj and the judging unit 1830 judges whether the generated group of three-dimensional vectors Raj matches the group of three-dimensional vectors Rbk.

Here, when the group of three-dimensional vectors Raj and the group of three-dimensional vectors Rbk do not have matching angles or do not have proportional magnitudes, the processing proceeds to step S2612, since the reference vector Vao has already been renewed (S2608). In step S2612, another value j is searched in the first data storing unit 1840 where the values j for defining a new reference vector Vao have been stored (S2612). If there is a value j which has not been used in the first data storing unit 1840 (S2610), a two-dimensional vector Vaj defined by the value j replaces the reference vector Vao as a new reference vector Vao (S2611) and the processing returns to step S2603.

Thus, two-dimensional vectors Vaj respectively defined by the stored values j are set one at a time as a reference vector Vao to generate a group of three-dimensional vectors Raj, and the generated group of three-dimensional vectors Raj and the group of three-dimensional vectors Rbk are judged whether they have matching angles and whether their magnitudes are proportional.

When there is no value of j left in the first data storing unit 1840 (S2610), the judging unit 1830 judges that the captured image and the standard image do not match (S2613) and the matching processing is terminated.

The reason for renewing the reference vector Vao in step S2611 is as follows.

As described above, a group of three-dimensional vectors is generated by setting one of two-dimensional vectors as a reference vector. For a group of three-dimensional vectors Raj [j=1~N1] which relates to the set of captured image data, the group is generated by setting one two-dimensional vector Vaj as a reference vector Vao and expressing the other two-dimensional vectors Vaj present in spatial positions Paj using the reference vector Vao present in a spatial position Pao as a reference point and direction. Similarly, a group of three-dimensional vectors Rbk [k=1~N2] which relates to the set of standard image data is generated by setting one two-dimensional vector Vbk as a reference vector Vbo and expressing the other two-dimensional vectors Vbk using the reference vector Vbo as a reference point and direction. Accordingly, when the object in the captured image and the object in the standard image are geometrically similar and differs only in sizes/orientations, by setting Vaj and Vbk corresponding to the same part of the object as the reference vectors Vao and Vbo, the captured image is judged as matching the standard image as a result of judgements in steps S2605 and S2606.

In other words, it is necessary to set such reference vectors Vao and Vbo that correspond to the same part of the object. To do so, a two-dimensional vector with a large spatial gradient is provisionally set as a reference vector in step S2601, since there is a great possibility that a part with a most distinctive peripheral feature in one image would match a part with a most distinctive peripheral feature in the other image.

If the provisionally set two reference vectors do not correspond to the same part of the object, one of the reference vectors needs to be changed to find two reference vectors which correspond to the same part of the object. Here, it is desirable to change a reference vector of a group with no more two-dimensional vectors than the other group.

Accordingly, when N1<N2, the reference vector Vao is changed to another two-dimensional vector Vaj that is suitable as a new reference vector, while the reference vector Vbo is unchanged. To find such a suitable reference vector efficiently, the judging unit 1830 performs step S2609.

The reference vector Vao, the two-dimensional vector Vaj, and the vector Roj shown in FIGS. 12 and 13 can be represented in complex numbers as follows:

$$Vao = e^{j\delta 1} \quad \text{(Formula 33)}$$

$$Vaj = e^{j\delta 2} \quad \text{(Formula 34)}$$

$$Roj = |Roj|e^{j\delta 3} \quad \text{(Formula 35)}$$

where $j$ denotes an imaginary number.

With Formulas 33~35, a component βj of a three-dimensional vector Raj(|Roj|,αj,βj) is an angle formed by the two-dimensional vector Vaj with the reference vector Vao and is expressed as (δ2−δ1), while a component αj of Raj(|Roj|,αj,βj) is an angle formed by the vector Roj with the reference vector Vao and is expressed as (δ3−δ1).

On the other hand, an angle formed by the reference vector Vao with the two-dimensional vector Vaj is expressed as (δ1−δ2) that is equivalent to −βj. An angle which a vector Rjo, the reverse of the vector Roj, forms with the two-dimensional vector Vaj is expressed as (π+δ3−δ2) that is equivalent to (π+δ3−δ1−δ2+δ1)=(π+αj−βj), since Rjo is out of phase with Roj by π.

Accordingly, a three-dimensional vector Raj obtained by expressing the reference vector Vao relative to each of the other two-dimensional vectors Vaj is shown as (|Roj|,π+α−β,−β) that has the same magnitude as the original three-dimensional vector Raj, with the angles being changed as β→−β, α→π+α−β.

Thus, while the original group of three-dimensional vectors Raj expresses positions and angles of N1 two-dimensional vectors Vaj relative to a reference vector Vao, the group of three-dimensional vectors Raj obtained after changing the angles of the original group of three-dimensional vectors Raj expresses positions and angles of a reference vector Vao relative to N1 two-dimensional vectors Vaj.

After angles of all three-dimensional vectors Raj are changed in step S2609 as above, each combination of a three-dimensional vector Raj and a three-dimensional vector Rbk, among the newly obtained group of three-dimensional vectors Raj and the group of three-dimensional vectors Rbk, that satisfies |αj−αk|<T1 and |βj−βk|<T2 is detected to find values j that define two-dimensional vectors Vaj which are suitable as a reference vector. Two-dimensional vectors Vaj that can be considered as possible reference vectors are thus narrowed down.

Second Embodiment

The following is a description of an image recognition system 5000 in the second embodiment of the image matching apparatus of the present invention, with reference to the figures.

The image recognition system 5000 is a variant of the image recognition system 1000 of the first embodiment and in particular aims to compare a captured image with a standard image while minimizing effects caused by errors that occur due to differences in sampling of the captured image and the standard image.

<Functional Configuration>

Figure 14:
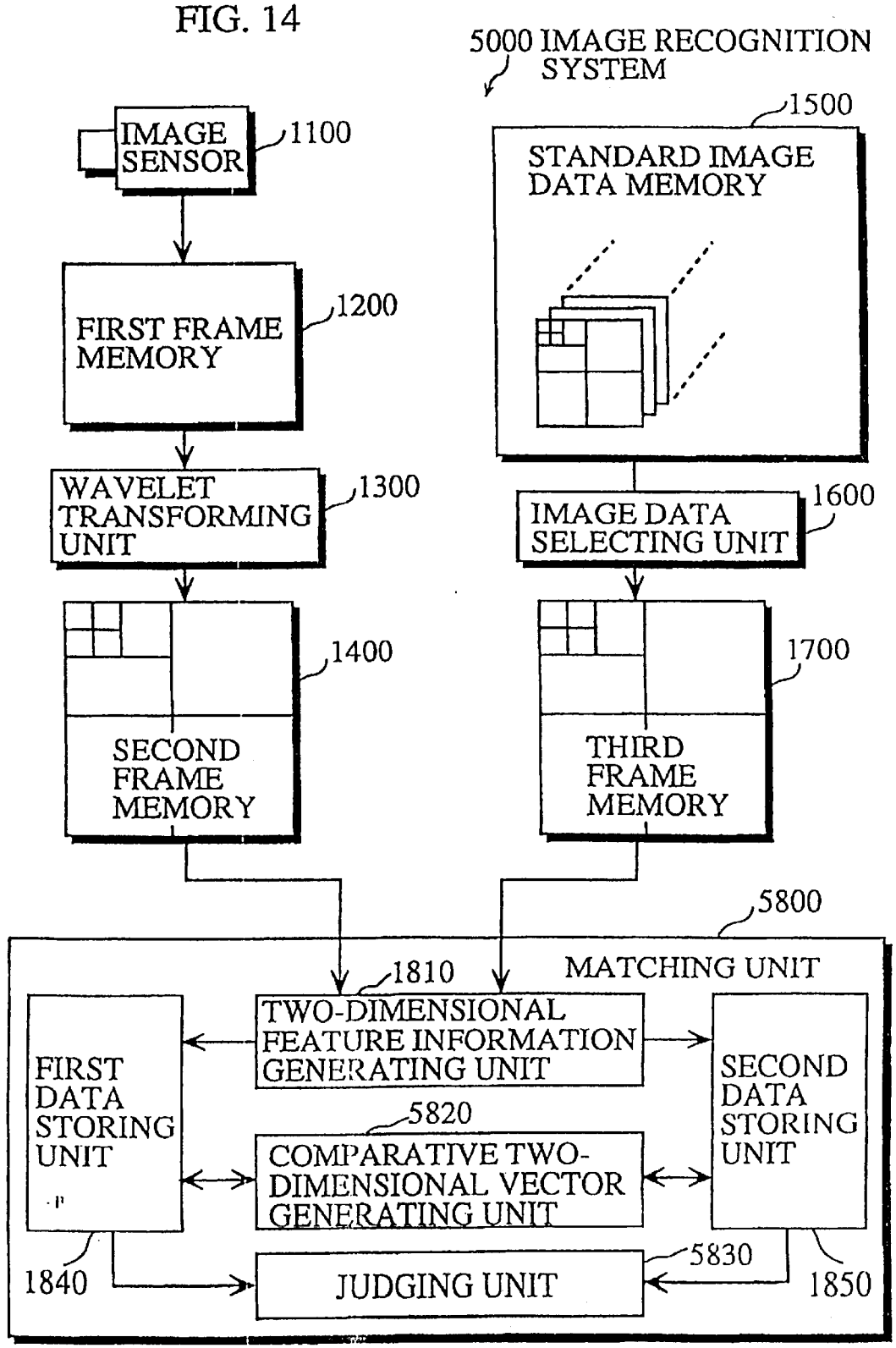
FIG. 14 shows the functional configuration of an image recognition system 5000 of the second embodiment of the present invention.

FIG. 14 shows the functional configuration of the image recognition system 5000 of the second embodiment.

This image recognition system 5000 recognizes a captured image by comparing the captured image data with preset standard image data and judging whether the captured image matches the standard image. The image sensor 1100, the first frame memory 1200, the wavelet transforming unit 1300, the second frame memory 1400, the standard image data memory 1500, the image data selecting unit 1600, the third frame memory 1700, and a matching unit 5800 are included in the image recognition system 5000.

The image recognition system 5000 is implemented via a computer except for the image sensor 1100, where the wavelet transforming unit 1300, the image data selecting unit 1600, and the matching unit 5800 are software-controlled.

Note here that construction elements which are the same as those in the first embodiment shown in FIG. 3 have been given the same reference numerals and their explanation has been omitted, so that the following explanation will focus on the differences with the first embodiment.

The matching unit 5800 compares a set of image data in the second frame memory 1400 with a set of image data in the third frame memory 1700 to judge whether a captured image matches a standard image. The matching unit 5800 is roughly made up of the first data storing unit 1840 as a memory, the second data storing unit 1850 as a memory, the two-dimensional feature information generating unit 1810, a comparative two-dimensional vector generating unit 5820, and a judging unit 5830. The two-dimensional feature information generating unit 1810 generates two-dimensional feature information from each of the set of captured image data in the second frame memory 1400 and the set of standard image data in the third frame memory 1700, and stores two-dimensional feature information of the set of captured image data and two-dimensional feature information of the set of standard image data respectively in the first data storing unit 1840 and the second data storing unit 1850. This two-dimensional feature information generating unit 1810 is the same as the first embodiment. The comparative two-dimensional vector generating unit 5820 generates comparative two-dimensional vector groups (described later) from each of the two-dimensional feature information in the first data storing unit 1840 and the two-dimensional feature information in the second data storing unit 1850. The judging unit 5830 compares the generated comparative two-dimensional vector groups to judge whether the captured image and the standard image match.

<Operation>

The operation of the image recognition system 5000 will be described below.

The operation of the image recognition system 5000 differs with the image recognition system 1000 of the first embodiment only in matching processing in step S2600 (see FIG. 7).

Accordingly, the following explanation will focus on matching processing to be performed after generation of two-dimensional feature information (see S2500 in FIG. 7 and FIG. 8).

Once the two-dimensional feature information generating unit 1810 has stored two-dimensional feature information (combinations of spatial positions P(x,y) and two-dimensional vectors V(k12,k21)) of the set of captured image data and the set of standard image data respectively in the first data storing unit 1840 and the second data storing unit 1850, matching for the captured image and the standard image is performed mainly by the comparative two-dimensional vector generating unit 5820 and the judging unit 5830.

This matching processing will be explained below with reference to FIGS. 15–17.

Figure 15:
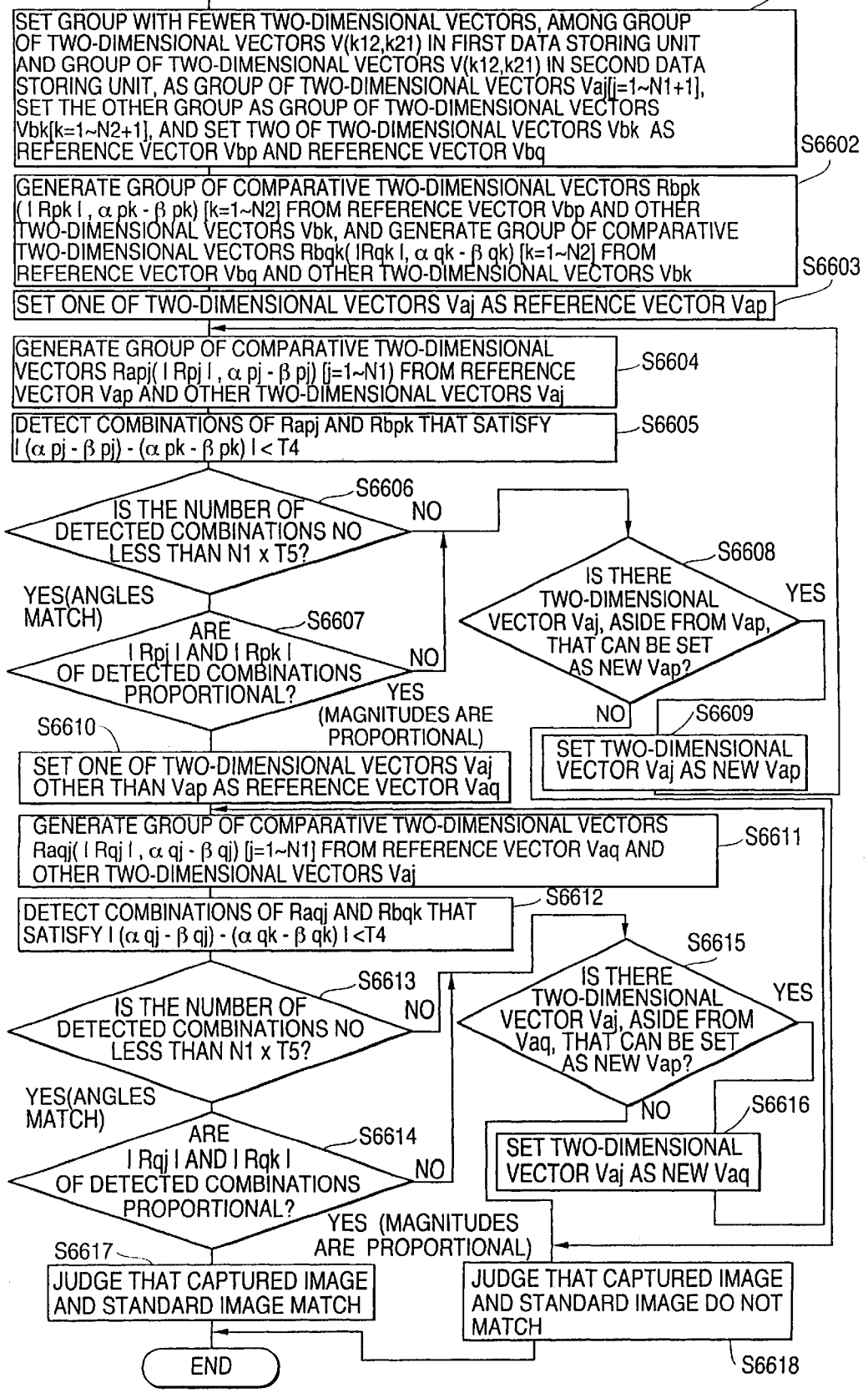
FIG. 15 is a flowchart showing the matching processing of the image recognition system 5000.

FIG. 15 is a flowchart showing the matching processing of the image recognition system 5000.

The comparative two-dimensional vector generating unit 5820 compares the number of two-dimensional vectors V(k12,k21) in the first data storing unit 1840 with the number of two-dimensional vectors V(k12,k21) in the second data storing unit 1850.

Suppose the number of two-dimensional vectors V in the first data storing unit 1840 is smaller than the number of two-dimensional vectors V in the second data storing unit 1850. The group of (N1+1) two-dimensional vectors V in the first data storing unit 1840 is set as a group of two-dimensional vectors Vaj (k12,k21) [j=1~N1+1], while the group of (N2+1) two-dimensional vectors V in the second data storing unit 1850 is set as a group of two-dimensional vectors Vbk(k12,k21) [k=1~N2+1]. A spatial position of a two-dimensional vector Vaj (k12,k21) is set as a spatial position Paj(x,y), while a spatial position of a two-dimensional vector Vbk(k12,k21) is set as a spatial position Pbk(x,y).

The comparative two-dimensional vector generating unit 5820 sets two of the two-dimensional vectors Vbk as a reference vector Vbp and a reference vector Vbq (S6601).

More specifically, the comparative two-dimensional vector generating unit 5820 selects a two-dimensional vector Vbk, from two-dimensional vectors Vbk whose |k12|+|k21| is largest in the group of two-dimensional vectors Vbk, as the reference vector Vbp. The comparative two-dimensional vector generating unit 5820 then selects a two-dimensional vector Vbk, whose spatial position Pbk(x,y) is most distant from the reference vector Vbp in the group of two-dimensional vectors Vbk, as the reference vector Vbq. Hereinafter a spatial position of the reference vector Vbp and a spatial position of the reference vector Vbq are respectively referred to as Pbp(x,y) and Pbq(x,y).

The comparative two-dimensional vector generating unit 5820 generates a group of N2 comparative two-dimensional vectors Rbpk(|Rpk|,αpk−βpk) [k=1~N2] from the reference vector Vbp and two-dimensional vectors Vbk aside from the reference vector Vbp. The comparative two-dimensional vector generating unit 5820 also generates a group of N2 comparative two-dimensional vectors Rbqk(|Rqk|,αqk−βqk) [k=1N2] from the reference vector Vbq and two-dimensional vectors Vbk aside from the reference vector Vbq (S6602) (a comparative two-dimensional vector Rbpk (|Rpk|,αpk−βpk) and a comparative two-dimensional vector Rbqk(|Rqk|,αqk−βqk) are hereafter also referred to as Rbpk and Rbqk)

The group of comparative two-dimensional vectors Rbpk and the group of comparative two-dimensional vectors Rbqk are then stored in the second data storing unit 1850.

The processing of generating the group of comparative two-dimensional vectors Rbpk will be described below.

Figure 16:
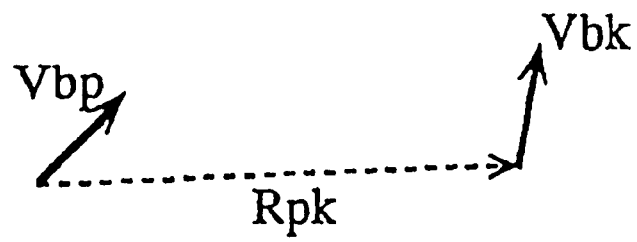
FIG. 16 shows a reference vector Vbp and a two-dimensional vector Vbk.

FIG. 16 shows a reference vector Vbp(k12,k21) present in a spatial position Pbp(x,y) and a two-dimensional vector Vbk(k12,k21) present in a spatial position Pbk(x,y).

In the figure, x coordinates of Pbp and Pbk and components k12 (spatial gradients in the horizontal direction) of Vbp and Vbk are set as vector components in the first direction, while y coordinates of Pbp and Pbk and components k21 (spatial gradients in the vertical direction) of Vbp and Vbk are set as vector components in the second direction that is perpendicular to the first direction. The figure also shows a vector Rpk from the spatial position Pbp to the spatial position Pbk.

A comparative two-dimensional vector Rbpk is composed of a magnitude |Rpk| of the vector Rpk and a difference αpk−βpk, where αpk denotes an angle which the vector Rpk forms with the reference vector Vbp, and βpk denotes an angle which the two-dimensional vector Vbk forms with the reference vector Vbp.

The angles αpk and βpk are calculated as follows:

$$\alpha pk = \arctan((|Rpk \times Vbp|)/(Rpk \cdot Vbp)) \quad \text{(Formula 36)}$$

$$\beta pk = \arctan((|Vbk \times Vbp|)/(Vbk \cdot Vbp)) \quad \text{(Formula 37)}$$

where $-\pi/2 < \alpha pk \leq \pi/2$ and $-\pi/2 < \beta pk \leq \pi/2$. Here, $\alpha pk = \pi/2$ when the denominator in Formula 36 is 0, while $\beta pk = \pi/2$ when the denominator in Formula 37 is 0. In the above formulas, arctan denotes inverse tangent, × denotes vector outer product, and · denotes vector inner product.

Figure 17:
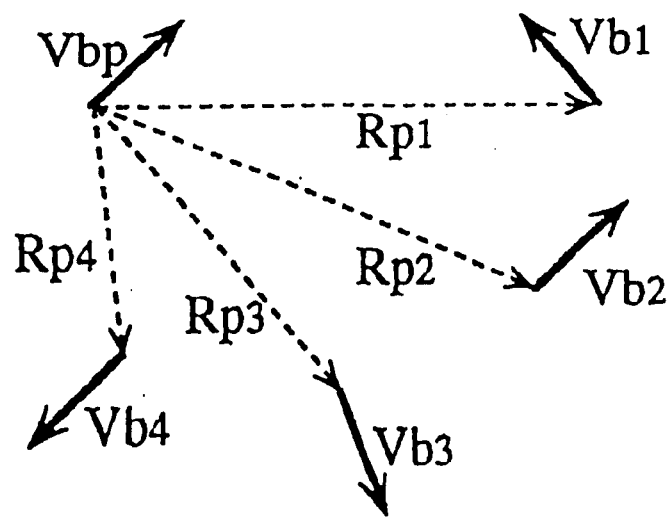
FIG. 17 shows the reference vector Vbp and a plurality of two-dimensional vectors Vbk.

FIG. 17 shows the reference vector Vbp and a plurality of two-dimensional vectors Vbk.

When Rp1 is a vector from the origin of the reference vector Vbp to the origin of a two-dimensional vector Vb1, a comparative two-dimensional vector Rbp1 is composed of |Rp1| and αp1−βp1, where αp1 is an angle formed by Rp1 with Vbp, and βp1 is an angle formed by Vb1 with Vbp. Similarly, a comparative two-dimensional vector Rbp2 is composed of |Rp2| and αp2−βp2. The other comparative two-dimensional vectors Rbpk are generated in the same way.

The above processing also applies to generation of the group of comparative two-dimensional vectors Rbqk.

After generating the group of comparative two-dimensional vectors Rbpk and the group of comparative two-dimensional vectors Rbqk, the comparative two-dimensional vector generating unit 5820 designates one of the two-dimensional vectors Vaj as a reference vector Vap (S6603).

Here, the reference vector Vap is selected from two-dimensional vectors Vaj (k12,k21) whose |k12|+|k21| is largest in the group of two-dimensional vectors Vaj.

By doing so, when the captured image and the standard image show the same object, there is a possibility that the reference vector Vap corresponds to the same part of the object as the reference vector Vbp.

The comparative two-dimensional vector generating unit 5820 then generates a group of Ni comparative two-dimensional vectors Rapj (|Rpj|,αpj−βpj) [j=1~N1] from the reference vector Vap and two-dimensional vectors Vaj aside from the reference vector Vap, and stores the generated group in the first data storing unit 1840 (S6604). Here, the comparative two-dimensional vectors Rapj are generated in the same way as the comparative two-dimensional vectors Rbpk described above.

Once the group of comparative two-dimensional vectors Rapj has been generated by the comparative two-dimensional vector generating unit 5820, the judging unit 5830 judges for the group of comparative two-dimensional vectors Rapj and the group of comparative two-dimensional vectors Rbpk whether they have matching angles and whether their magnitudes are proportional. This judgement process on angles and magnitudes is performed as follows.

The judging unit 5830 detects, among the group of comparative two-dimensional vectors Rapj [j=1~N1] and the group of comparative two-dimensional vectors Rbpk [k=1~N2], each combination of a comparative two-dimensional vector Rapj and a comparative two-dimensional vector Rbpk that satisfies |(αpj−βpj)−(αpk−βpk)|<T4 (S6605). If the number of such combinations is no less than N1×T5 (S6606), the judging unit 5830 judges that the group of comparative two-dimensional vectors Rapj and the group of comparative two-dimensional vectors Rbpk have matching angles.

Here, T4 and T5 are predetermined threshold values, such as T4=π/18 and T5=0.9.

In step S6605, a combination of Rapj and Rbpk that satisfies the above inequality is searched by setting the value j of Rapj and incrementing the value k of Rbpk from 1 to N2 by 1. When such a combination is found, the value j is renewed and the same procedure is repeated. Which is to say, it is sufficient to find one comparative two-dimensional vector Rbpk for each comparative two-dimensional vector Rapj.

When judging that the group of comparative two-dimensional vectors Rapj and the group of comparative two-dimensional vectors Rbpk have matching angles, the judging unit 5830 judges, for all of the combinations found in step S6605, whether components |Rpj| and components |Rpk| are proportional (S6607).

Here, to have proportional magnitude components means that the two images represented by the group of comparative two-dimensional vectors Rapj and the group of comparative two-dimensional vectors Rbpk are geometrically similar. When components |Rpj| and |Rpk| of every combination of Rapj and Rbpk detected in step S6605 are set as C1 and D1, C2 and D2, C3 and D3, . . . , Cn and Dn, γ is calculated according to Formula 32. If γ approximates to 1, the two groups are judged as having proportional magnitudes. Note here that the range of values (such as 0.9~1.1) approximating to 1 has been determined in advance by the judging unit 5830.

When the judging unit 5830 judges that the group of comparative two-dimensional vectors Rapj and the group of comparative two-dimensional vectors Rbpk do not have matching angles or do not have proportional magnitudes (S6606 and S6607), the judging unit 5830 searches the group of two-dimensional vectors Vaj for a two-dimensional vector Vaj, aside from the two-dimensional vector Vaj set as the reference vector Vap in step S6603, that can be set as a new reference vector Vap (S6608). If there is such a two-dimensional vector Vaj, the judging unit 5830 replaces the reference vector Vap with the two-dimensional vector Vaj as a new reference vector Vap (S6609). The processing then returns to step S6604 where the comparative two-dimensional vector generating unit 5820 newly generates a group of comparative two-dimensional vectors Rapj using the new reference vector Vap.

More specifically, in step S6608 the judging unit 5830 searches in the group of two-dimensional vectors Vaj(k12, k21) for each two-dimensional vector Vaj with the value |k12|+|k21| no less than, for example, 80% of the largest |k12|+|k21| of the original reference vector Vap, and extracts such two-dimensional vectors Vaj one by one in order of decreasing |k12|+|k21|. As a result, if any of the conditions in steps S6606 and S6607 is not satisfied, a two-dimensional vector Vaj with larger |k12|+|k21| is set as a new reference vector Vap in step S6609 and the judgements in steps S6606 and S6607 are repeated, in order to find a two-dimensional vector Vaj that corresponds to the reference vector Vbp.

If there is no two-dimensional vector Vaj, aside from the reference vector Vap, that can be set as a new reference vector Vap in step S6608, the judging unit 5830 judges that the captured image and the standard image do not match (S6618) and ends the processing.

Meanwhile, if the judging unit 5830 judges in step S6607 that the group of comparative two-dimensional vectors Rapj and the group of comparative two-dimensional vectors Rbpk have proportional magnitudes, it indicates that there is a great possibility that a spatial position Pap(x,y) of the reference vector Vap corresponds to the same part of an object as the spatial position Pbp of the reference vector Vbp. In such a case, the processing proceeds to step S6610 where the comparative two-dimensional vector generating unit 5820 designates one of the two-dimensional vectors Vaj other than the reference vector Vap as a reference vector Vaq.

Here, a two-dimensional vector Vaj whose spatial position is most distant from the spatial position Pap of the reference vector Vap in the group of two-dimensional vectors Vaj is selected as the reference vector Vaq. Which is to say, a two-dimensional vector Vaj defined by j of the largest |Rpj| in the group of comparative two-dimensional vectors Rapj is set as Vaq.

Thus, the reference vector Vaq is provisionally set on the assumption that a spatial position of such a reference vector would correspond to the same part of an object as the spatial position Pbq of the reference vector Vbq.

On setting the reference vector Vaq, the comparative two-dimensional vector generating unit 5820 generates a group of N1 comparative two-dimensional vectors Raqj (|Rqj|,αqj−βqj) [j=1~N1] from the reference vector Vaq and two-dimensional vectors Vaj other than Vaq, and stores the generated group of comparative two-dimensional vectors Raqj in the first data storing unit 1840 (S6611).

Next, the judging unit 5830 judges for the group of comparative two-dimensional vectors Raqj [j=1~N1] and the group of comparative two-dimensional vectors Rbqk [k=1~N2] whether they have matching angles and whether their magnitudes are proportional, as follows.

The judging unit 5830 first detects, among the group of comparative two-dimensional vectors Raqj and the group of comparative two-dimensional vectors Rbqk, each combination of a comparative two-dimensional vector Raqj and a comparative two-dimensional vector Rbqk that satisfies |(αqj−βqj)−(αqk−βqk)|<T4 (S6612). If the number of such combinations is no less than N1×T5 (S6613), the judging unit 5830 judges that the group of comparative two-dimensional vectors Raqj and the group of comparative two-dimensional vectors Rbqk have matching angles.

In step S6612, a combination of Raqj and Rbqk that satisfies the above inequality is searched by setting the value j of Raqj and incrementing the value k of Rbqk from 1 to N2 by 1. When such a combination is found, the value j is renewed and the same procedure is repeated. Which is to say, it is sufficient to find one comparative two-dimensional vector Rbqk for each comparative two-dimensional vector Raqj.

When judging that the group of comparative two-dimensional vectors Raqj and the group of comparative two-dimensional vectors Rbqk have matching angles, the judging unit 5830 judges, for all of the combinations found in step S6612, whether components |Rqj| and components |Rqk| are proportional (S6614).

If the group of comparative two-dimensional vectors Raqj and the group of comparative two-dimensional vectors Rbqk have proportional magnitudes in step S6614, the judging unit 5830 judges that the captured image and the standard image match (S6617) and completes the matching processing.

If the group of comparative two-dimensional vectors Raqj and the group of comparative two-dimensional vectors Rbqk do not have matching angles in step S6613 or if the group of comparative two-dimensional vectors Raqj and the group of comparative two-dimensional vectors Rbqk do not have proportional magnitudes in step S6614, the judging unit 5830 searches the group of two-dimensional vectors Vaj for a two-dimensional vector Vaj, aside from the two-dimensional vector Vaj set as the reference vector Vaq in step S6610, that can be set as a new reference vector Vaq (S6615). If there is such a two-dimensional vector Vaj, the judging unit 5830 replaces the reference vector Vaq with the two-dimensional vector Vaj as a new reference vector Vaq (S6616).

The processing then returns to step S6611 where the comparative two-dimensional vector generating unit 5820 newly generates a group of comparative two-dimensional vectors Raqj using the new reference vector Vaq.

More specifically, in step S6615 the judging unit 5830 searches in the group of two-dimensional vectors Vaj (k12, k21) for each two-dimensional vector Vaj whose distance from the spatial position Pap of the reference vector Vap is no less than 80% of the largest distance that is between the reference vector Vaq and the reference vector Vap, and extracts such two-dimensional vectors Vaj one by one in order of lessening distance. As a result, if any of the conditions in steps S6613 and S6614 is not satisfied, a two-dimensional vector Vaj that is more distant from Pap than other two-dimensional vectors Vaj is set as a new reference vector Vaq in step S6616 and the judgements in steps S6613 and S6614 are repeated, in order to find a two-dimensional vector Vaj that corresponds to the reference vector Vbq.

If there is no two-dimensional vector Vaj, aside from the reference vector Vaq, that can be set as a new reference vector Vaq in step S6615, the judging unit 5830 judges that the captured image and the standard image do not match (S6618) and ends the processing.

<Consideration>

Reduction of effects caused by sampling errors that occur due to differences in sampling of a captured image and a standard image in the image recognition apparatus 5000 will be explained below, in comparison with the image recognition system 1000.

It is unlikely that a position of each set of pixel data of a captured image completely matches a position of each set of pixel data of a standard image in sampling. Accordingly, sampling points of the captured image and the standard image usually differ due to differences in capturing the images.

For instance, in the first embodiment components αj and βj of a three-dimensional vector Raj(|Roj|,αj,βj) are equally affected by sampling errors relating to an angle of a reference vector Vao. In the second embodiment, in contrast, while αpj and βpj of a comparative two-dimensional vector Rapj (|Rpj|,αpj−βpj) are equally affected by sampling errors relating to an angle of a reference vector Vap, such sampling errors are deleted for a component (αpj−βpj).

Thus, by using comparative two-dimensional vectors, the image recognition system 5000 compares two images accurately without being affected by sampling errors relating to angles of reference vectors.

In the second embodiment, for example, each two-dimensional vector Vaj is uniquely identified by specifying Rapj (|Rpj|,αpj−βpj) relative to a reference vector Vap and specifying Raqj(|Rqj|,αqj−βqj) relative to a reference vector Vaq. As a result, the image recognition system 5000 can perform matching of a captured image and a standard image with precision, by comparing two groups of comparative two-dimensional vectors generated from the captured image with two groups of comparative two-dimensional vectors generated from the standard image (that is, comparison of Rapj with Rbpk and comparison of Raqj with Rbqk).

<Variant>

A variant of a process of specifying a reference vector Vap (step S6603 in FIG. 15) by the comparative two-dimensional vector generating unit 5820 in the image recognition system 5000 will be explained below. The process in step S6603 can be modified as follows.

The comparative two-dimensional vector generating unit 5820 provides a memory area of a two-dimensional xy coordinate space for each two-dimensional vector Vaj (k12, k21) in the group of (N1+1) two-dimensional vectors Vaj which are each present on a two-dimensional coordinate Paj (x,y) in an image. When the image is a two-dimensional image composed of N×M sets of pixel data, one two-dimensional xy coordinate space is associated with an N×M-bit memory area.

The comparative two-dimensional vector generating unit 5820 first initializes a memory area (two-dimensional xy coordinate space) of each two-dimensional vector Vaj (Va1, Va2, . . . ) to 0. The comparative two-dimensional vector generating unit 5820 then changes every bit, which corresponds to a point on each straight line that passes through Paj (x,y) and that has a gradient ($\alpha pk - \beta pk$) against Vaj, from 0 to 1 in each memory area. Here, the gradient of Vaj in the two-dimensional xy coordinate space is defined by setting k12 of Vaj as a component of the x coordinate and setting k21 of Vaj as a component of the y coordinate, while ($\alpha pk - \beta pk$) is an angle component of each comparative two-dimensional vector Rbpk in the group of comparative two-dimensional vectors Rbpk. Since k=1~N2 in this case, N2 straight lines are created.

After the N2 straight lines are generated in each of the (N1+1) two-dimensional xy coordinate spaces, the comparative two-dimensional vector generating unit 5820 totals values (0 or 1) of points present on the same coordinates in the all of the two-dimensional xy coordinate spaces and obtains coordinates with the largest sum. The comparative two-dimensional vector generating unit 5820 then detects Vaj whose Paj is nearest to the obtained coordinates and sets detected Vaj as a reference vector Vap.

Figure 18:
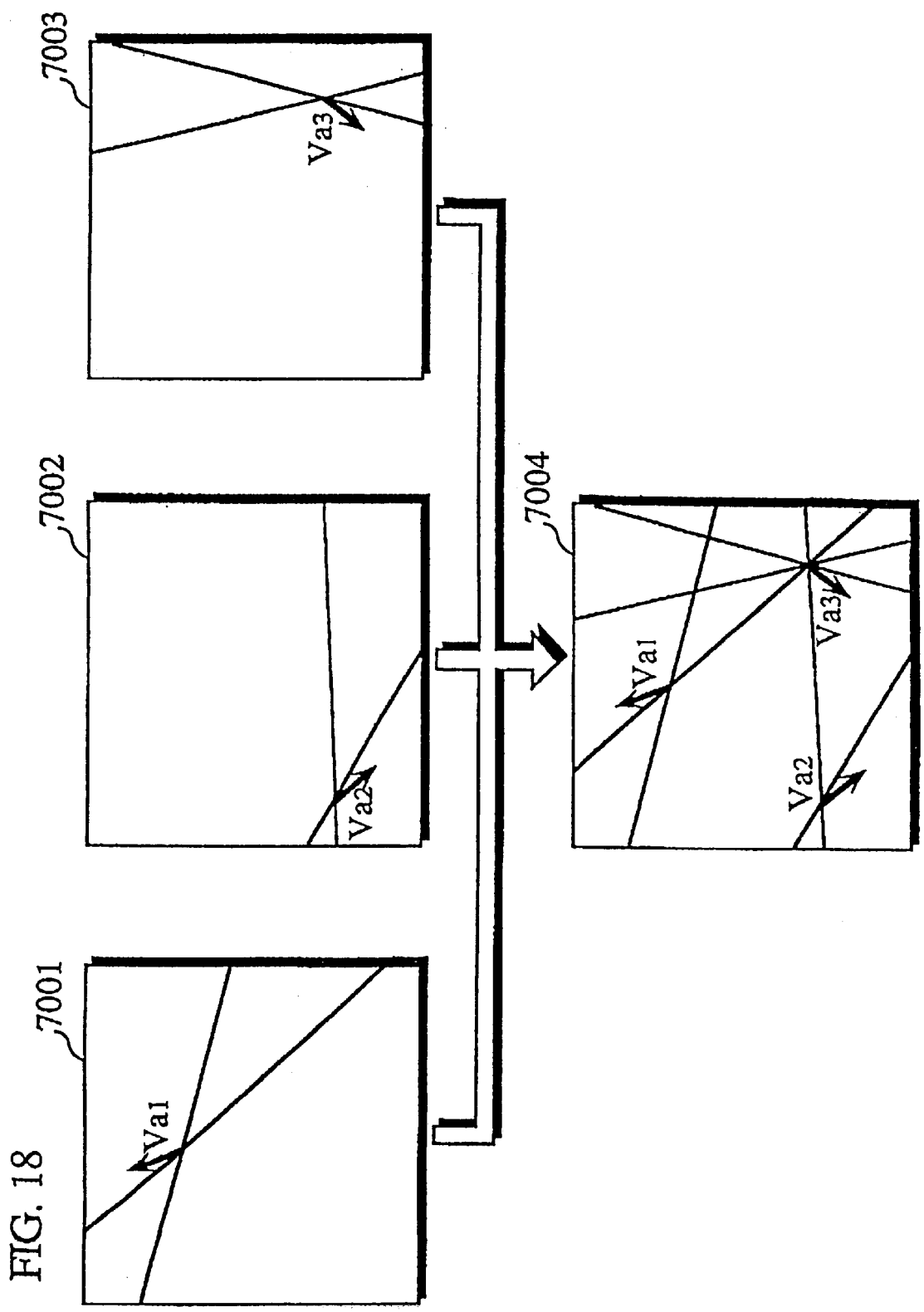
FIG. 18 is a conceptual diagram showing a method of deriving a reference vector Vap in a variant of the image recognition system 5000.

FIG. 18 is a conceptual diagram showing the method of specifying a reference vector Vap in this variant of the image recognition system 5000.

For the simplicity's sake, the number of comparative two-dimensional vectors Rbpk is set at 2 and the number of two-dimensional vectors Vaj is set at 3 in the figure. Here, an image from which the comparative two-dimensional vectors Rbpk have been generated is characterized by the two-dimensional vectors Vbp, Vb1 and Vb3 in FIG. 17, whereas the other image to be compared with this image has been rotated 180° and reduced to 70% of its original size, and is characterized by two-dimensional vectors Va1~Va3.

Let $\theta 1$ be an angle component ($\alpha p1 - \beta p1$) of Rbp1 and $\theta 2$ be an angle component ($\alpha p2 - \beta p2$) of Rbp2. In a memory area of a two-dimensional xy coordinate space 7001, 1 is assigned to every bit that corresponds to a point on each straight line which passes through Pa1 and has a gradient $\theta 1$ or $\theta 2$ against Va1. In a memory area of a two-dimensional xy coordinate space 7002, 1 is assigned to every bit that corresponds to a point on each straight line which passes through Pa2 and has a gradient $\theta 1$ or $\theta 2$ against Va2. Similarly, in a memory area of a two-dimensional xy coordinate space 7003, 1 is assigned to every bit that corresponds to a point on each straight line which passes through Pa3 and has a gradient $\theta 1$ or $\theta 2$ against Va3. The two-dimensional xy coordinate spaces 7001~7003 are combined in a two-dimensional xy coordinate space 7004 in FIG. 18. As shown in the figure, the two-dimensional vector Va3 is nearest to the coordinates whose total sum is the largest in the two-dimensional xy coordinates spaces 7001~7003, so that Va3 is set as a reference vector Vap corresponding to Vbp shown in FIG. 17.

Supplemental Remarks

Though the image matching apparatus of the present invention has been described based on the above embodiments, the present invention is not limited to such. For instance, the following modifications are possible.

(1) In the first embodiment, judgement on whether the group of three-dimensional vectors Raj [j=1~N1] and the group of three-dimensional vectors Rbk [k=1~N2] have matching angles has been made based on the number of combinations of Raj and Rbk that satisfy $|\alpha j - \alpha k| < T1$ and $|\beta j - \beta k| < T2$, with one three-dimensional vector Rbk having been searched for each three-dimensional vector Raj to find such combinations (steps S2604 and S2605 in FIG. 11). However, the above judgement may instead be performed in the following way.

Suppose $\alpha j$ of a three-dimensional vector Raj and $\alpha k$ of a three-dimensional vector Rbk are set as e components and $\beta j$ of Raj and $\beta k$ of Rbk are set as $\beta$ components. $2\pi$ is divided by 36 and as a result 36×36 categories, such as a category where $0 < (\alpha \text{ component}) < \pi/18$ and $0 < (\beta \text{ component}) < \pi/18$, a category where $0(\alpha \text{ component}) < \pi/18$ and $\pi/18 < (\beta \text{ component}) < 2\pi/18$, . . . , are created. Then, each three-dimensional vector Raj and each three-dimensional vector Rbk are sorted into one of the categories where its $\alpha$ and $\beta$ components belong to. If the number of categories that each include at least one three-dimensional vector Raj and at least one three-dimensional vector Rbk is no less than a predetermined proportion to N1, it is judged that the group of three-dimensional vectors Raj [j=1~N1] and the group of three-dimensional vectors Rbk [k=1~N2] have matching angles. Here, $2\pi$ may not necessarily be divided by 36. Also, in the above modification or in step S2605 in FIG. 11, instead of using a predetermined ratio to N1, it may be judged that the two groups have matching angles if the number of categories or the number of combinations of Raj and Rbk is no less than a predetermined value or no less than a value derived from N1 and N2 by a predetermined operation.

Also, judgement on magnitudes (step S2606 in FIG. 11) may be performed differently from the first embodiment, as long as it can be judged whether |Roj| and |Rok| in combinations of Raj and Rbk that have matching angles are proportional to some extent.

For example, n categories are created in the above process and a number 1~n is assigned to each category. Also, a mean value of |Roj| of a plurality of three-dimensional vectors Raj in the "i"th category is set as Ci and a mean value of |Rok| of a plurality of three-dimensional vectors Rbk in the same category is set as Di. In such a case, if $\gamma$ in Formula 32 approximates to 1, it is judged that magnitudes of the group of three-dimensional vectors Raj and magnitudes of the group of three-dimensional vectors Rbk are proportional.

These modifications can also be applied to the matching between the group of comparative two-dimensional vectors Rapj and the group of comparative two-dimensional vectors Rbpk and between the group of comparative two-dimensional vectors Raqj and the group of comparative two-dimensional vectors Rbqk in the second embodiment.

(2) While the angles of the group of three-dimensional vectors Raj have been changed to select a new reference vector Vao from the group of two-dimensional vectors Vaj in the first embodiment, two-dimensional vectors Vaj(k12,k21) with decreasing |k12|+|k21| may be selected one by one as a new reference vector Vao.

Also, to initially determine reference vectors Vao and Vbo in the first embodiment (step S2601 in FIG. 11), a two-dimensional vector Vaj(k12,k21) with largest |k12|+|k21| and a two-dimensional vector Vbk(k12,k21) with largest |k12|+|k21| have been selected respectively as Vao and Vbo. However, a two-dimensional vector Vaj present in a spatial position that is nearest to a mean value of all spatial positions Paj corresponding to the group of two-dimensional vectors Vaj may be set as Vao, for example.

(3) While the number m of wavelet decomposition operations performed by the wavelet transforming unit 1300 on a set of captured image data has been determined with respect to the data size of a set of standard image data in the above embodiments, the present invention is not limited to such. Note here that an amount of data of horizontal and vertical MRR components obtained by the m wavelet decomposition operations decreases as the value m increases, so that matching processing can be performed at high speed.

(4) Each set of standard image data in the standard image data memory 1500 has already been wavelet-decomposed in the above embodiments. However, the image recognition system may be constructed differently, as long as two images can be compared based on horizontal and vertical spatial gradients obtained by two-dimensional orthogonal wavelet decomposition. For instance, each set of standard image data in the standard image data memory 1500 may not be wavelet-decomposed yet, so that the image recognition system retrieves a set of standard image data from the standard image data memory 1500 and performs two-dimensional orthogonal wavelet decomposition whenever necessary.

(5) While the two-dimensional feature information generating unit 1810 has used the threshold value T (step S2520 in FIG. 8) to generate two-dimensional feature information for both a set of captured image data and a set of standard image data in the above embodiments, different threshold values may be used for the set of captured image data (step S2300 in FIG. 7) and the set of standard image data (step S2500 in FIG. 7). Also, in step S2520 in FIG. 8, a threshold value to be compared with a horizontal MRR component (k12) may be different with a threshold value to be compared with a vertical MRR component (k21). Also, instead of comparing each of k12 and k21 with a threshold value, a predetermined number (such as 20) of two-dimensional vectors V(k12,k21) may be selected in order of decreasing sum of k12 and k21, with combinations of such two-dimensional vectors V(k12,k21) and spatial positions P(x,y) being stored in a data storing unit. By narrowing down features appearing on the edge of an image based on a predetermined criterion as above, the number of elements used for image matching can be limited, with it being possible to reduce computational complexity and processing time.

(6) While monochrome images with an 8-step graduation have been used in the above embodiments, color images may instead be used. When a color image is used, a value of each set of pixel data may be defined by not only an intensity level but also an amount of a color component. In such a case, a group of two-dimensional vectors is generated by performing predetermined operations to calculate horizontal and vertical special gradients of data corresponding to each position of the color image, and the generated group of two-dimensional vectors is used as two-dimensional feature information in image matching. Also, image matching may separately be performed for each color component such as red, blue, and green.

(7) In the second embodiment, a two-dimensional vector Vbk with largest |k12|+|k21| has been set as a reference vector Vbp and a two-dimensional vector Vbk with a spatial position most distant from the reference vector Vbp has been set as a reference vector Vbq. However, a two-dimensional vector Vbk with largest |k12|+|k21| and a two-dimensional vector Vbk with second largest |k12|+|k21| may be set respectively as the reference vectors Vbp and Vbq. Alternatively, two two-dimensional vectors Vbk with a spacing between them no less than a predetermined value may be set as Vbp and Vbq. Note here that the same two-dimensional vector Vbk cannot be used as both Vbp and Vbq.

Initial selection of Vap and Vaq and subsequent selection of Vap and Vaq from the group of two-dimensional vectors Vaj should be modified depending on how Vbp and Vbq were selected. Suppose a two-dimensional vector Vbk with largest |k12|+|k21| was set as Vbp and a two-dimensional vector Vbk present at a distance r from Vbp was set as Vbq. In this case, a two-dimensional vector Vaj with largest |k12|+|k21| is selected initially as Vap, while Vaq is initially set as follows: calculating a ratio between a mean value of |Rpj| of a group of comparative two-dimensional vectors Rapj and a mean value of |Rpk| of a group of comparative two-dimensional vectors Rbpk; multiplying the ratio by r to obtain r'; and selecting a two-dimensional vector Vaj whose distance from Vap is the closest to r' as Vaq. To renew this Vaq, a two-dimensional vector Vaj whose distance from Vap is the second closest to r' can be set as new Vaq.

Also, a user of the image recognition system can arbitrarily designate Vbp and Vbq or designate Vbp and Vbq based on predetermined features.

In the second embodiment, two-dimensional vectors Vaj with the value |k12|+|k21| no less than 80% of the largest |k12|+|k21| of the original reference vector Vap have been set as possible reference vectors Vap. Also, two-dimensional vectors Vaj whose distance from the spatial position Pap of the reference vector Vap is no less than 80% of the largest distance that is between the reference vector Vaq and the reference vector Vap, have been set as possible reference vectors Vaq. Instead, Vap and Vaq can be selected unconditionally, although the use of the above criteria has the effect of reducing computational complexity and processing time.

(8) In the second embodiment, after it was judged that a group of comparative two-dimensional vectors Rbpk and a group of comparative two-dimensional vectors Rapj generated using a reference vector Vap match (step S6607 in FIG. 15), the reference vector Vap has not been changed. Alternatively, steps S6604~S6607 may be performed for every possible reference vector Vap found in step S6608, wherein subsequent steps S6610~S6618 are performed using each reference vector Vap with which it is judged that two groups of comparative two-dimensional vectors match. In this case, when step S6615 in FIG. 15 results in the negative, the processing proceeds to step S6608 instead of step S6618.

(9) In the variant of the second embodiment, a straight line that passes through Paj may be given a width of several pixels. Also, when a plurality of xy coordinates with the largest sum total are found in two-dimensional xy coordinate spaces, a two-dimensional vector Vaj nearest to one of these xy coordinates may be provisionally set as a reference vector Vap, whereas two-dimensional vectors Vaj nearest to the other xy coordinates are used as possible reference vectors Vap in step S6608 in FIG. 15. The method of detecting Vap in the variant of the second embodiment can also be used for detecting Vaq in step S6610 in FIG. 15.

(10) A machine language program that implements the operation of the image recognition system (shown in FIGS. 7, 8, 11, and 15) described in the above embodiments can be stored in a storage medium, such as an IC card, an optical disc, a floppy disc, or a ROM, and distributed for sale. By installing such a machine language program in a program executable apparatus such as a general-purpose computer via the storage medium and executing the program, the above described image recognition can be realized.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image matching apparatus for judging whether a first two-dimensional image and a second two-dimensional image match, the first two-dimensional image and the second two-dimensional image each being made up of a plurality of sets of pixel data in a two-dimensional xy coordinate plane, the image matching apparatus comprising:

first two-dimensional vector group storing means for storing a plurality of two-dimensional vectors Va which are generated using a plurality of sets of pixel data of the first two-dimensional image and which respectively correspond to a plurality of positions in the first two-dimensional image, each of the plurality of two-dimensional vectors Va including a component relating to an x direction and a component relating to a y direction to show a feature, among a plurality of features of the first two-dimensional image, that is present in a corresponding position, wherein the x component and they component respectively are a spatial gradient of a value of a set of pixel data in the x direction and a spatial gradient of the value of the set of pixel data in the y direction;

second two-dimensional vector group storing means for storing a plurality of two-dimensional vectors Vb which are generated using a plurality of sets of pixel data of the second two-dimensional image and which respectively correspond to a plurality of positions in the second two-dimensional image, each of the plurality of two-dimensional vectors Vb including a component relating to the x direction and a component relating to the y direction to show a feature, among a plurality of features of the second two-dimensional image, that is present in a corresponding position, wherein the x component and they component respectively are a spatial gradient of a value of a set of pixel data in the x direction and a spatial gradient of the value of the set of the pixel data in the y direction; and matching means for judging that the first two-dimensional image and the second two-dimensional image match, when a distribution of the plurality of two-dimensional vectors Va stored in said first two-dimensional vector group storing means in the two dimensional xy coordinate plane and a distribution of the plurality of two-dimensional vectors Vb stored in said second two dimensional vector group storing means in the two-dimensional xy coordinate plane satisfy predetermined matching conditions, wherein said matching means includes:

a first reference specifying unit for specifying one of the plurality of positions in the first two-dimensional image as a first position;

a second reference specifying unit for specifying one of the plurality of positions in the second two-dimensional image as a second position;

a first three-dimensional vector group generating unit for generating, for each respective position of the plurality of positions in the first two-dimensional image aside from the first position, a three-dimensional vector Ra composed of a component r, a component $\alpha$, and a component $\beta$, the component r being a magnitude of a two-dimensional vector Roa which directs from the first position to the respective position, the component $\alpha$ being an angle which the two-dimensional vector Roa forms with a two-dimensional vector Va present in the first position, and the component $\beta$ being an angle which a two-dimensional vector Va present in the respective position forms with the two-dimensional vector Va present in the first position;

a second three-dimensional vector group generating unit for generating, for each respective position of the plurality of positions in the second two-dimensional image aside from the second position, a three-dimensional vector Rb composed of a component r, a component $\alpha$, and a component $\beta$, the component r being a magnitude of a two-dimensional vector Rob which directs from the second position to the respective position, the component $\alpha$ being an angle which the two-dimensional vector Rob forms with a two-dimensional vector Vb present in the second position, and the component $\beta$ being an angle which a two-dimensional vector Vb present in the respective position forms with the two-dimensional vector Vb present in the second position; and a first judging unit for judging that the predetermined matching conditions are satisfied and accordingly the first two-dimensional image and the second two-dimensional image match, when in a distribution of a plurality of three-dimensional vectors Ra generated by said first three-dimensional vector group generating unit and in a distribution of a plurality of three-dimensional vectors Rb generated by said second three-dimensional vector group generating unit, components $\alpha$ and components $\beta$ of the plurality of three-dimensional vectors Ra match components $\alpha$ and components $\beta$ of the plurality of three-dimensional vectors Rb to a first predetermined degree, and components r of the plurality of three-dimensional vectors Ra are proportional to components r of the plurality of three-dimensional vectors Rb to a second predetermined degree.

2. The image matching apparatus of claim 1,
wherein said first judging unit judges that the predetermined matching conditions are satisfied and accordingly the first two-dimensional image and the second two-dimensional image match, when a number of combinations of three-dimensional vectors Ra and three-dimensional vectors Rb, obtained by detecting each three-dimensional vector Ra, among the plurality of three-dimensional vectors Ra, whose component $\alpha$ and component $\beta$ match a component $\alpha$ and a component $\beta$ of any of the plurality of three-dimensional vectors Rb to a third predetermined degree, is no less than a predetermined value, and a ratio between a component r of a three-dimensional vector Ra and a component r of a three-dimensional vector Rb in each of the combinations is constant to a fourth predetermined degree for all of the combinations.

3. The image matching apparatus of claim 2,
wherein spatial gradients in the x direction and spatial gradients in the y direction of the plurality of two-dimensional vectors Va in said first two-dimensional vector group storing means are obtained by performing two-dimensional orthogonal wavelet decomposition on the first two-dimensional image a first number of times using a Haar basis, and wherein spatial gradients in the x direction and spatial gradients in the y direction of the plurality of two-dimensional vectors Vb in said second two-dimensional vector group storing means are obtained by performing two-dimensional orthogonal wavelet decomposition on the second two-dimensional image a second number of times using the Haar basis.

4. The image matching apparatus of claim 3, wherein each respective position of the plurality of positions in the first two-dimensional image that respectively correspond to the plurality of two-dimensional vectors Va stored in said first two-dimensional vector group storing means is determined so that at least one of the spatial gradient in the x direction and the spatial gradient in the y direction of the two-dimensional vector present in the respective position exceeds a first predetermined value, and wherein each respective position of the plurality of positions in the second two-dimensional image that respectively correspond to the plurality of two-dimensional vectors Vb stored in the second two-dimensional vector group storing means is determined so that at least one of the spatial gradient in the x direction and the spatial gradient in the y direction of the two-dimensional vector present in the respective position exceeds a second predetermined value.

5. The image matching apparatus of claim 4, wherein said matching means further includes:

a third three-dimensional vector group generating unit for replacing the component $\alpha$ and the component $\beta$ of each of the plurality of three-dimensional vectors Ra respectively with $(\pi+\alpha-\beta)$ and $(-\beta)$, where $\alpha$ and $\beta$ are the component $\alpha$ and the component $\beta$ of the three-dimensional vector Ra, as a new component $\alpha$ and a new component $\beta$, when in the distribution of the plurality of three-dimensional vectors Ra and in the distribution of the plurality of three-dimensional vectors Rb, the components $\alpha$ and the components $\beta$ of the plurality of three-dimensional vectors Ra do not match the components $\alpha$ and the components $\beta$ of the plurality of three-dimensional vectors Rb to the first predetermined degree or when the components r of the plurality of three-dimensional vectors Ra are not proportional to the components r of the plurality of three-dimensional vectors Rb to the second predetermined degree, setting one of the plurality of positions in the first two-dimensional image aside from the first position as a new first position, the new first position corresponding to a three-dimensional vector Ra, among the plurality of three-dimensional vectors Ra with new components $\alpha$ and new components $\beta$, whose new component $\alpha$ and new component $\beta$ match the component $\alpha$ and the component $\beta$ of any of the plurality of three-dimensional vectors Rb to the third predetermined degree, and generating, for each respective portion of the plurality of positions in the first two-dimensional image aside from the new first position, a three-dimensional vector Rc composed of a component r, a component $\alpha$, and a component $\beta$, the component r being a magnitude of a two-dimensional vector Roa which directs from the new first position to the respective position, the component $\alpha$ being an angle which the two-dimensional vector Roa forms with a two-dimensional vector Va present in the new first position, and the component $\beta$ being an angle which a two-dimensional vector Va present in the respective position forms with the two-dimensional vector Va present in the new first position; and a second judging unit for judging that the predetermined matching conditions are satisfied and accordingly the first two-dimensional image and the second two-dimensional image match, when in a distribution of a plurality of three-dimensional vectors Rc generated by said third three-dimensional vector group generating unit and in the distribution of the plurality of three-dimensional vectors Rb generated by said second three-dimensional vector group generating unit, the components $\alpha$ and the components $\beta$ of the plurality of three-dimensional vectors Rc match the components $\alpha$ and the components $\beta$ of the plurality of three-dimensional vectors Rb to the first predetermined degree, and the components r of the plurality of three-dimensional vectors Rc are proportional to the components r of the plurality of three-dimensional vectors Rb to the second predetermined degree.

6. The image matching apparatus of claim 5, wherein when, among a group of the plurality of three-dimensional vectors Ra generated by said first three-dimensional vector group generating unit and a group of the plurality of three-dimensional vectors Rb generated by said second three-dimensional vector group generating unit, a group with no more three-dimensional vectors than another group is set as a three-dimensional vector group R1, said first judging unit uses a value that has a predetermined ratio to a number of three-dimensional vectors included in the three-dimensional vector group R1, as the predetermined value.

7. The image matching apparatus of claim 2, wherein when, among a group of the plurality of three-dimensional vectors Ra generated by said first three-dimensional vector group generating unit and a group of the plurality of three-dimensional vectors Rb generated by said second three-dimensional vector group generating unit, a group with no more three-dimensional vectors than another group is set as a three-dimensional vector group R1, said first judging unit uses a value that has a predetermined ratio to a number of three-dimensional vectors included in the three-dimensional vector group R1, as the predetermined value.

8. The image matching apparatus of claim 3, wherein a number of the plurality of positions in the first two-dimensional image which respectively correspond to the plurality of two-dimensional vectors Va stored in said first two-dimensional vector group storing means is limited within a first predetermined number, and wherein a number of the plurality of positions in the second two-dimensional image which respectively correspond to the plurality of two-dimensional vectors Vb stored in said second two-dimensional vector group storing means is limited within a second predetermined number.

9. The image matching apparatus of claim 1, wherein each respective position of the plurality of positions in the first two-dimensional image that respectively correspond to the plurality of two-dimensional vectors Va stored in said first two-dimensional vector group storing means is determined so that at least one of the spatial gradient in the x direction and the spatial gradient in the y direction of the two-dimensional vector present in the respective position exceeds a first predetermined value, spatial gradients in the x direction and spatial gradients in the y direction of the plurality of two-dimensional vectors Va being obtained by performing two-dimensional orthogonal wavelet decomposition on the first two-dimensional image a first number of times using a Haar basis, and wherein each respective position of the plurality of positions in the second two-dimensional image that respectively correspond to the plurality of two-dimensional vectors Vb stored in said second two-dimensional vector group storing means is determined so that at least one of the spatial gradient in the x direction and the spatial gradient in the y direction of the two-dimensional vector present in the respective position exceeds a second predetermined value, spatial gradients in the x direction and spatial gradients in the y direction of the plurality of two-dimensional vectors Vb being obtained by performing two-dimensional orthogonal wavelet decomposition on the second two-dimensional image a second number of times using the Haar basis.

10. The image matching apparatus of claim 1, wherein said matching means further includes:

a third three-dimensional vector group generating unit for replacing the component $\alpha$ and the component $\beta$ of each of the plurality of three-dimensional vectors Ra respectively with ($\pi+\alpha-\beta$) and ($-\beta$) where $\alpha$ and $\beta$ are the component $\alpha$ and the component $\beta$ of the three-dimensional vector Ra, as a new component $\alpha$ and a new component $\beta$, when in the distribution of the plurality of three-dimensional vectors Ra and in the distribution of the plurality of three-dimensional vectors Rb, the components $\alpha$ and the components $\beta$ of the plurality of three-dimensional vectors Ra do not match the components $\alpha$ and the components $\beta$ of the plurality of three-dimensional vectors Rb to the first predetermined degree or when the components r of the plurality of three-dimensional vectors Ra are not proportional to the components r of the plurality of three-dimensional vectors Rb to the second predetermined degree, setting one of the plurality of positions in the first two-dimensional image aside from the first position as a new first position, the new first position corresponding to a three-dimensional vector Ra, among the plurality of three-dimensional vectors Ra with new components $\alpha$ and new components $\beta$, whose new component $\alpha$ and new component $\beta$ match the component $\alpha$ and the components $\beta$ of any of the plurality of three-dimensional vectors Rb to a third predetermined degree, and generating, for each respective position of the plurality of positions in the first two-dimensional image aside from the new first position, a three-dimensional vector Rc composed of a component r, a component $\alpha$, and a component $\beta$, the component r being a magnitude of a two-dimensional vector Roa which directs from the new first position to the respective position, the component $\alpha$ being an angle which the two-dimensional vector Roa forms with a two-dimensional vector Va present in the new first position, and the component $\beta$ being an angle which a two-dimensional vector Va present in the respective position forms with the two-dimensional vector Va present in the new first position; and a second judging unit for judging that the predetermined matching conditions are satisfied and accordingly the first two-dimensional image and the second two-dimensional image match, when in a distribution of a plurality of three-dimensional vectors Rc generated by said third three-dimensional vector group generating unit and in the distribution of the plurality of three-dimensional vectors Rb generated by the said three-dimensional vector group generating unit, the components $\alpha$ and the components $\beta$ of the plurality of three-dimensional vectors Rc match the components $\alpha$ and the components $\beta$ of the plurality of three-dimensional vectors Rb to the first predetermined degree, and the components r of the plurality of three-dimensional vectors Rc are proportional to the components r of the plurality of three-dimensional vectors Rb to the second predetermined degree.

11. An image matching apparatus for judging whether a first two-dimensional image and a second two-dimensional image match, the first two-dimensional image and the second two-dimensional image each being made up of a plurality of sets of pixel data in a two-dimensional xy coordinate plane, the image matching apparatus comprising:

first two-dimensional vector group storing means for storing a plurality of two-dimensional vectors Va which are generated using a plurality of sets of pixel data of the first two-dimensional image and which respectively correspond to a plurality of positions in the first two-dimensional image, each of the plurality of two-dimensional vectors Va including a component relating to an x direction and a component relating to a y direction to show a feature, among a plurality of features of the first two-dimensional image, that is present in a corresponding position, wherein the x component and they component respectively are a spatial gradient of a value of a set of pixel data in the x direction and a spatial gradient of the value of the set of pixel data in the y direction;

second two-dimensional vector group storing means for storing a plurality of two-dimensional vectors Vb which are generated using a plurality of sets of pixel data of the second two-dimensional image and which respectively correspond to a plurality of positions in the second two-dimensional image, each of the plurality of two-dimensional vectors Vb including a component relating to the x direction and a component relating to the y direction to show a feature, among a plurality of features of the second two-dimensional image, that is present in a corresponding position, wherein the x component and they component respectively are a spatial gradient of a value of a set of pixel data in the x direction and a spatial gradient of the value of the set of the pixel data in the y direction; and matching means for judging that the first two-dimensional image and the second two-dimensional image match, when a distribution of the plurality of two-dimensional vectors Va stored in said first two-dimensional vector group storing means in the two-dimensional xy coordinate plane and a distribution of the plurality of two-dimensional vectors Vb stored in said second two dimensional vector group storing means in the two-dimensional xy coordinate plane satisfy predetermined matching conditions, wherein said matching means includes:

a first reference specifying unit for specifying one of the plurality of positions in the first two-dimensional image as a first position;

a second reference specifying unit for specifying one of the plurality of positions in the second two-dimensional image as a second position;

a third reference specifying unit for specifying one of the plurality of positions in the first two-dimensional image aside from the first position as a third position;

a fourth reference specifying unit for specifying one of the plurality of positions in the second two-dimensional image aside from the second position as a fourth position;

a first comparative two-dimensional vector group generating unit for generating, for each respective position of the plurality of positions in the first two-dimensional image aside from the first position, a comparative two-dimensional vector Rap composed of a component r and a component ($\alpha$–$\beta$), the component r being a magnitude of a two-dimensional vector Roap which directs from the first position to the respective position, $\alpha$ being an angle which the two-dimensional vector Roap forms with a two-dimensional vector Va in the first position, and $\beta$ being an angle which a two-dimensional vector Va in the respective position forms with the two-dimensional vector Va in the first position;

a second comparative two-dimensional vector group generating unit for generating, for each respective position of the plurality of positions in the second two-dimensional image aside from the second position, a comparative two-dimensional vector Rbp composed of a component r and a component ($\alpha$–$\beta$), the component r being a magnitude of a two-dimensional vector Robp which directs from the second position to the respective position, $\alpha$ being an angle which the two-dimensional vector Robp forms with a two-dimensional vector Vb in the second position, and $\beta$ being an angle which a two-dimensional vector Vb in the respective position forms with the two-dimensional vector Vb in the second position;

a third comparative two-dimensional vector group generating unit for generating, for each respective position of the plurality of positions in the first two-dimensional image aside from the third position, a comparative two-dimensional vector Raq composed of a component r and a component ($\alpha$–$\beta$), the component r being a magnitude of a two-dimensional vector Roaq which directs from the third position to the respective position, $\alpha$ being an angle which the two-dimensional vector Roaq forms with a two-dimensional vector Va in the third position, and $\beta$ being an angle which a two-dimensional vector Va in the respective position forms with the two-dimensional vector Va in the third position;

a fourth comparative two-dimensional vector group generating unit for generating, for each respective position of the plurality of positions in the second two-dimensional image aside from the fourth position, a comparative two-dimensional vector Rbq composed of a component r and a component ($\alpha$–$\beta$), the component r being a magnitude of a two-dimensional vector Robq which directs from the fourth position to the respective position, $\alpha$ being an angle which the two-dimensional vector Robq forms with a two-dimensional vector Vb in the fourth position, and $\beta$ being an angle which a two-dimensional vector Vb in the respective position forms with the two-dimensional vector Vb in the fourth position; and a judging unit for judging that the predetermined matching conditions are satisfied and accordingly the first two-dimensional image and the second two-dimensional image match, when in a distribution of a plurality of comparative two-dimensional vectors Rap generated by said first comparative two-dimensional vector group generating unit and in a distribution of a plurality of comparative two-dimensional vectors Rbp generated by said second comparative two-dimensional vector group generating unit, components ($\alpha$–$\beta$) of the plurality of comparative two-dimensional vectors Rap match components ($\alpha$–$\beta$) of the plurality of comparative two-dimensional vectors Rbp to a first predetermined degree, and components r of the plurality of comparative two-dimensional vectors Rap are proportional to components r of the plurality of comparative two-dimensional vectors Rbp to a second predetermined degree, and in a distribution of a plurality of comparative two-dimensional vectors Raq generated by said third comparative two-dimensional vector group generating unit and in a distribution of a plurality of comparative two-dimensional vectors Rbq generated by said fourth comparative two-dimensional vector group generating unit, components ($\alpha$–$\beta$) of the plurality of comparative two-dimensional vectors Raq match components ($\alpha$–$\beta$) of the plurality of comparative two-dimensional vectors Rbq to the first predetermined degree, and components r of the plurality of comparative two-dimensional vectors Raq are proportional to components r of the plurality of comparative two-dimensional vectors Rbq to the second predetermined degree.

12. The image matching apparatus of claim 11, wherein said judging unit judges that the predetermined matching conditions are satisfied and accordingly the first two-dimensional image and the second two-dimensional image match, when:

a number of combinations of comparative two-dimensional vectors Rap and comparative two-dimensional vectors Rbp, obtained by detecting each comparative two-dimensional vector Rap, among the plurality of comparative two-dimensional vectors Rap, whose component ($\alpha$–$\beta$) matches a component ($\alpha$–$\beta$) of any of the plurality of comparative two-dimensional vectors Rbp to a third predetermined degree, is no less than a predetermined value, and a ratio between a component r of a comparative two-dimensional vector Rap and a component r of a comparative two-dimensional vector Rbp in each of the combinations is constant to a fourth predetermined degree for all of the combinations; and a number of combinations of comparative two-dimensional vectors Raq and comparative two-dimensional vectors Rbq, obtained by detecting each comparative two-dimensional vector Raq, among the plurality of comparative two-dimensional vectors Raq, whose component ($\alpha$–$\beta$) matches a component ($\alpha$–$\beta$) of any of the plurality of comparative two-dimensional vectors Rbq to the third predetermined degree, is no less than the predetermined value, and a ratio between a component r of a comparative two-dimensional vector Raq and a component r of a comparative two-dimensional vector Rbq in each of the combinations is constant to the fourth predetermined degree for all of the combinations.

13. The image matching apparatus of claim 12, wherein spatial gradients in the x direction and spatial gradients in the y direction of the plurality of two-dimensional vectors Va in said first two-dimensional vector group storing means are obtained by performing two-dimensional orthogonal wavelet decomposition on the first two-dimensional image a first number of times using a Haar basis, and wherein spatial gradients in the x direction and spatial gradients in the y direction of the plurality of two-dimensional vectors vb in said second two-dimensional vector group storing means are obtained by performing two-dimensional orthogonal wavelet decomposition on the second two-dimensional image a second number of times using the Haar basis.

14. The image matching apparatus of claim 13, wherein each respective position of the plurality of positions in the first two-dimensional image that respectively correspond to the plurality of two-dimensional vectors Va stored in said first two-dimensional vector group storing means is determined so that at least one of the spatial gradient in the x direction and the spatial gradient in the y direction of the two-dimensional vector present in the respective position exceeds a first predetermined value, and wherein each respective position of the plurality of positions in the second two-dimensional image that respectively correspond to the plurality of two-dimensional vectors Vb stored in said second two-dimensional vector group storing means is determined so that at least one of the spatial gradient in the x direction and the spatial gradient in the y direction of the two-dimensional vector present in the respective position exceeds a second predetermined value.

15. The image matching apparatus of claim 14, wherein when, among a group of the plurality of comparative two-dimensional vectors Rap generated by said first comparative two-dimensional vector group generating unit and a group of the plurality of comparative two-dimensional vectors Rbp generated by said second comparative two-dimensional vector group generating unit, a group with no more comparative two-dimensional vectors than another group is set as a comparative two-dimensional vector group Rp1, said judging unit uses a value that has a predetermined ratio to a number of comparative two-dimensional vectors included in the comparative two-dimensional vector group Rp1, as the predetermined value.

16. The image matching apparatus of claim 15, wherein a number of the plurality of positions in the first two-dimensional image which respectively correspond to the plurality of two-dimensional vectors Va in said first two-dimensional vector group storing means is limited within a first predetermined number, and wherein a number of the plurality of positions in the second two-dimensional image which respectively correspond to the plurality of two-dimensional vectors Vb in said second two-dimensional vector group storing means is limited within a second predetermined number.

17. The image matching apparatus of claim 11, wherein said third reference specifying unit specifies a position that is most distant from the first position among the plurality of positions in the first two-dimensional image, as the third position, when a number of combinations of comparative two-dimensional vectors Rap and comparative two-dimensional vectors Rbp, obtained by detecting each comparative two-dimensional vector Rap whose component ($\alpha-\beta$) matches a component ($\alpha-\beta$) of any of the plurality of comparative two-dimensional vectors Rbp to a third predetermined degree, is no less than a predetermined value, and a ratio between a component r of a comparative two-dimensional vector Rap and a component r of a comparative two-dimensional vector Rbp in each of the combinations is constant to a fourth predetermined degree for all of the combinations.

18. The image matching apparatus of claim 11, wherein said second reference specifying unit:

creates, for each respective position of the plurality of positions in the second two-dimensional image, a plurality of straight lines that each pass through the respective position and that each form an angle corresponding to a component ($\alpha-\beta$) of any of the plurality of comparative two-dimensional vectors Rap generated by said first comparative two-dimensional vector group generating unit, with a two-dimensional vector Vb present in the position, detects coordinates of a pixel where a largest number of straight lines pass through in the second two-dimensional image, and specifies a position that is closest to the detected coordinates among the plurality of positions in the second two-dimensional image, as the second position.

19. A computer program embodied on a computer readable medium for use with a computer for judging whether a first two-dimensional image and a second two-dimensional image match, the first two-dimensional image and the second two-dimensional image each being made up of a plurality of sets of pixel data in a two-dimensional xy coordinate plane, the computer program comprising:

first two-dimensional vector group generating computer readable program code operable to generate a plurality of two-dimensional vectors Va respectively corresponding to a plurality of positions in the first two-dimensional image using a plurality of sets of pixel data of the first two-dimensional image, each of the plurality of two-dimensional vectors Va including a component relating to an x direction and a component relating to a y direction to show a feature, among a plurality of features of the first two-dimensional image, that is present in a corresponding position, wherein the x component and they component respectively are a spatial gradient of a value of a set of pixel data in the x direction and a spatial gradient of the value of the set of pixel data in the y direction;

second two-dimensional vector group generating computer readable program code operable to generate a plurality of two-dimensional vectors Vb respectively corresponding to a plurality of positions in the second two-dimensional image using a plurality of sets of pixel data of the second two-dimensional image, each of the plurality of two-dimensional vectors Vb including a component relating to the x direction and a component relating to the y direction to show a feature, among a plurality of features of the second two-dimensional image, that is present in a corresponding position, wherein the x component and the y component respectively are a spatial gradient of a value of a set of pixel data in the y direction and a spatial gradient of the value of the set of pixel data in the y direction; and matching computer readable program code operable to judge that the first two-dimensional image and the second two-dimensional image match, when a distribution of the plurality of two-dimensional vectors Vb generated in said first two-dimensional vector generating computer readable program code in the two-dimensional xy coordinate plane and a distribution of the plurality of two-dimensional vectors Vb generated in said second two-dimensional vector generating computer readable program code in the two-dimensional xy coordinate plane satisfy predetermined matching conditions, wherein said matching computer readable program code includes:

first reference specifying computer readable program code operable to specify one of the plurality of positions in the first two-dimensional image as a first position;

second reference specifying computer readable program code operable to specify one of the plurality of positions in the second two-dimensional image as a second position;

first three-dimensional vector group generating computer readable program code operable to generate, for each respective position of the plurality of positions in the first two-dimensional image aside from the first position, a three-dimensional vector Ra composed of a component r, a component α, and a component β, the component r being a magnitude of a two-dimensional vector Roa which directs from the first position to the respective position, the component α being an angle which the two-dimensional vector Roa forms with a two-dimensional vector Va present in the first position, and the component β being an angle which a two-dimensional vector Va present in the respective position forms with the two-dimensional vector Va present in the first position;

second three-dimensional vector group generating computer readable program code operable to generate, for each respective position of the plurality of positions in the second two-dimensional image aside from the second position, a three-dimensional vector Rb composed of a component r, a component α, and a component β, the component r being a magnitude of a two-dimensional vector Rob which directs from the second position to the respective position, the component α being an angle which the two-dimensional vector Rob forms with a two-dimensional vector Vb present in the second position, and the component β being an angle which a two-dimensional vector Vb present in the respective position forms with the two-dimensional vector Vb present in the second position; and judging computer readable program code operable to judge that the predetermined matching conditions are satisfied and accordingly the first two-dimensional image and the second two-dimensional image match, when a number of combinations of three-dimensional vectors Ra and three-dimensional vectors Rb, obtained by detecting each three-dimensional vector Ra, among a plurality of three-dimensional vectors Ra generated in said first three-dimensional vector group generating computer readable program code, whose component α and component β match a component α and a component β of any of a plurality of three-dimensional vectors Rb generated in said second three-dimensional vector group generating computer readable program code to a first predetermined degree, is no less than a predetermined value, and a ratio between a component r of a three-dimensional vector Ra and a component r of a three-dimensional vector Rb in each of the combinations is constant to a second predetermined degree for all of the combinations.

20. A computer program embodied on a computer readable medium for use with a computer for judging whether a first two-dimensional image and a second two-dimensional image match, the first two-dimensional image and the second two-dimensional image each being made up of a plurality of sets of pixel data in a two-dimensional xy coordinate plane, the computer program comprising:

first two-dimensional vector group generating computer readable program code operable to generate a plurality of two-dimensional vectors Va respectively corresponding to a plurality of positions in the first two-dimensional image using a plurality of sets of pixel data of the first two-dimensional image, each of the plurality of two-dimensional vectors Va including a component relating to an x direction and a component relating to a y direction to show a feature, among a plurality of features of the first two-dimensional image, that is present in a corresponding position, wherein the x component and they component respectively are a spatial gradient of a value of a set of pixel data in the x direction and a spatial gradient of the value of the set of pixel data in the y direction;

second two-dimensional vector group generating computer readable program code operable to generate a plurality of two-dimensional vectors Vb respectively corresponding to a plurality of positions in the second two-dimensional image using a plurality of sets of pixel data of the second two-dimensional image, each of the plurality of two-dimensional vectors Yb including a component relating to the x direction and a component relating to the y direction to show a feature, among a plurality of features of the second two-dimensional image, that is present in a corresponding position, wherein the x component and the y component respectively are a spatial gradient of a value of a set of pixel data in the x direction and a spatial gradient of the value of the set of pixel data in the y direction; and matching computer readable program code operable to judge that the first two-dimensional image and the second two-dimensional image match, when a distribution of the plurality of two-dimensional vectors Va generated in said first two-dimensional vector generating computer readable program code in the two-dimensional xy coordinate plane and a distribution of the plurality of two-dimensional vectors Vb generated in said second two-dimensional vector generating computer readable program code in the two-dimensional xy coordinate plane satisfy predetermined matching conditions, wherein said matching computer readable program code includes:

first reference specifying computer readable program code operable to specify one of the plurality of positions in the first two-dimensional image as a first position;

second reference specifying computer readable program code operable to specify one of the plurality of positions in the second two-dimensional image as a second position;

third reference specifying computer readable program code operable to specify one of the plurality of positions in the first two-dimensional image aside from the first position as a third position;

fourth reference specifying computer readable program code operable to specify one of the plurality of positions in the second two-dimensional image aside from the second position as a fourth position;

first comparative two-dimensional vector group generating computer readable program code operable to generate, for each respective position of the plurality of positions in the first two-dimensional image aside from the first position, a comparative two-dimensional vector Rap composed of a component r and a component ($\alpha-\beta$), the component r being a magnitude of a two-dimensional vector Roap which directs from the first position to the respective position, $\alpha$ being an angle which the two-dimensional vector Roap forms with a two-dimensional vector Va in the first position, and $\beta$ being an angle which a two-dimensional vector Va in the respective position forms with the two-dimensional vector Va in the first position;

second comparative two-dimensional vector group generating computer readable program code operable to generate, for each respective position of the plurality of positions in the second two-dimensional image aside from the second position, a comparative two-dimensional vector Rbp composed of a component r and a component ($\alpha-\beta$), the component r being a magnitude of a two-dimensional vector Robp which directs from the second position to the respective position, $\alpha$ being an angle which the two-dimensional vector Robp forms with a two-dimensional vector Vb in the second position, and $\beta$ being an angle which a two-dimensional vector Vb in the respective position forms with the two-dimensional vector Vb in the second position;

third comparative two-dimensional vector group generating computer readable program code operable for generating, for each respective position of the plurality of positions in the first two-dimensional image aside from the third position, a comparative two-dimensional vector Raq composed of a component r and a component ($\alpha-\beta$), the component r being a magnitude of a two-dimensional vector Roaq which directs from the third position to the respective position, $\alpha$ being an angle which the two-dimensional vector Roaq forms with a two-dimensional vector Va in the third position, and $\beta$ being an angle which a two-dimensional vector Va in the respective position forms with the two-dimensional vector Va in the third position;

fourth comparative two-dimensional vector group generating computer readable program code operable to generate, for each respective position of the plurality of positions in the second two-dimensional image aside from the fourth position, a comparative two-dimensional vector Rbq composed of a component r and a component ($\alpha-\beta$), the component r being a magnitude of a two-dimensional vector Robq which directs from the fourth position to the respective position, $\alpha$ being an angle which the two-dimensional vector Robq forms with a two-dimensional vector Vb in the fourth position, and $\beta$ being an angle which a two-dimensional vector Vb in the respective position forms with the two-dimensional vector Vb in the fourth position; and judging computer readable program code operable to judge that the predetermined matching conditions are satisfied and accordingly the first two-dimensional image and the second two-dimensional image match, when in a distribution of a plurality of comparative two-dimensional vectors Rap generated in said first comparative two-dimensional vector group generating computer readable program code and in a distribution of a plurality of comparative two-dimensional vectors Rbp generated in said second comparative two-dimensional vector group generating computer readable program code, components ($\alpha-\beta$) of the plurality of comparative two-dimensional vectors Rap match components ($\alpha-\beta$) of the plurality of comparative two-dimensional vectors Rbp to a first predetermined degree, and components r of the plurality of comparative two-dimensional vectors Rap are proportional to components r of the plurality of comparative two-dimensional vectors Rbp to a second predetermined degree, and in a distribution of a plurality of comparative two-dimensional vectors Raq generated in said third comparative two-dimensional vector group generating computer readable program code and in a distribution of a plurality of comparative two-dimensional vectors Rbq generated in said fourth comparative two-dimensional vector group generating computer readable program code, components ($\alpha-\beta$) of the plurality of comparative two-dimensional vectors Raq match components ($\alpha-\beta$) of the plurality of comparative two-dimensional vectors Rbq to the first predetermined degree, and components r of the plurality of comparative two-dimensional vectors Raq are proportional to components r of the plurality of comparative two-dimensional vectors Rbq to the second predetermined degree.

* * * * *